United States Patent [19]

Hirao et al.

[11] Patent Number: 5,313,198
[45] Date of Patent: May 17, 1994

[54] DATA COMMUNICATION APPARATUS

[75] Inventors: Iichi Hirao; Kazunori Morikawa; Hisato Fujisaka, all of Kyoto; Ryoichi Miyake, Kameoka, all of Japan

[73] Assignee: Omron Tateisi Electronics Co., Kyoto, Japan

[21] Appl. No.: 68,263

[22] Filed: May 28, 1993

Related U.S. Application Data

[63] Continuation of Ser. No. 641,806, Jan. 16, 1991, abandoned, which is a continuation of Ser. No. 280,498, Dec. 6, 1988, abandoned.

[51] Int. Cl.[5] .............................................. G08C 19/00
[52] U.S. Cl. ........................... 340/825.54; 340/825.69; 340/825.72
[58] Field of Search ............. 331/117 R, 117 FE, 173; 235/380; 342/42, 44, 51; 340/825.69, 825.72, 825, 825.54, 825.55, 505

[56] References Cited

U.S. PATENT DOCUMENTS

| 2,750,508 | 6/1956 | Waldhauer | 331/117 R |
|---|---|---|---|
| 2,878,386 | 3/1959 | Chow et al. | 331/117 R |
| 2,995,709 | 8/1961 | Beardwood et al. | 331/117 R |
| 3,070,757 | 12/1962 | Plogstedt et al. | 331/117 R |
| 3,299,424 | 1/1967 | Vinding . | |
| 3,389,391 | 6/1968 | Keeler II et al. . | |
| 3,465,724 | 9/1969 | Broadbent . | |
| 3,506,784 | 4/1970 | Garland | 331/117 R |
| 3,541,995 | 11/1970 | Fathauer . | |
| 3,701,510 | 10/1972 | Dame . | |
| 3,745,569 | 7/1973 | Works et al. . | |
| 3,774,114 | 11/1973 | Dahlgren . | |
| 3,859,624 | 1/1975 | Kriofsky et al. | 340/505 X |
| 3,898,619 | 8/1975 | Carsten et al. . | |
| 3,918,057 | 11/1975 | Van Tol . | |
| 3,964,024 | 6/1976 | Hutton et al. . | |
| 3,981,011 | 9/1976 | Bell, III . | |
| 4,027,276 | 5/1977 | Shaughnessy | 331/117 R |
| 4,040,053 | 8/1977 | Olsson . | |
| 4,087,791 | 5/1978 | Lemberger . | |
| 4,129,855 | 12/1978 | Rodrian . | |
| 4,184,746 | 1/1980 | Coale . | |
| 4,196,418 | 4/1980 | Kip et al. . | |
| 4,262,632 | 4/1981 | Hanton et al. . | |
| 4,333,072 | 6/1982 | Beigel | 340/825.54 |
| 4,364,043 | 12/1982 | Cole et al. | 340/825.54 |
| 4,473,825 | 9/1984 | Walton | 340/825.54 |
| 4,724,427 | 2/1988 | Carroll | 340/825.54 X |
| 4,730,188 | 3/1988 | Milheiser | 340/825 |

FOREIGN PATENT DOCUMENTS

| 0213666 | 3/1987 | European Pat. Off. . |
|---|---|---|
| 3035758 | 4/1982 | Fed. Rep. of Germany . |
| 2500944 | 6/1981 | France . |
| 62-63050 | 3/1987 | Japan . |
| 8601058 | 2/1986 | PCT Int'l Appl. . |

Primary Examiner—Ulysses Weldon
Attorney, Agent, or Firm—Dickstein, Shapiro & Morin

[57] ABSTRACT

A first device (1) and a second device (2) can be communicated by an electromagnetic coupling. Data to be transmitted from the first device to the second device is converted into pulse signals of different duty ratios in accordance with the H or L level of the transmission data. Further, the oscillation of an oscillator (15) of the first device is intermittently performed in accordance with the H/L level of the pulse signal. Switching elements (39, 40) are provided for a resonance circuit (30) provided in the second device. When data is transmitted from the second device to the first device, the switching elements are turned on or off in accordance with the data. Thus, the electromagnetic coupling is intermittently performed. The oscillator of the first device at that time intermittently executes the oscillation at a third duty ratio.

12 Claims, 16 Drawing Sheets

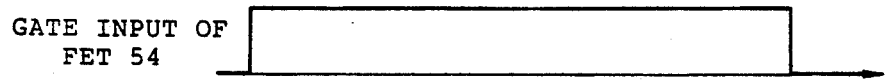
Fig.13a GATE INPUT OF FET 54
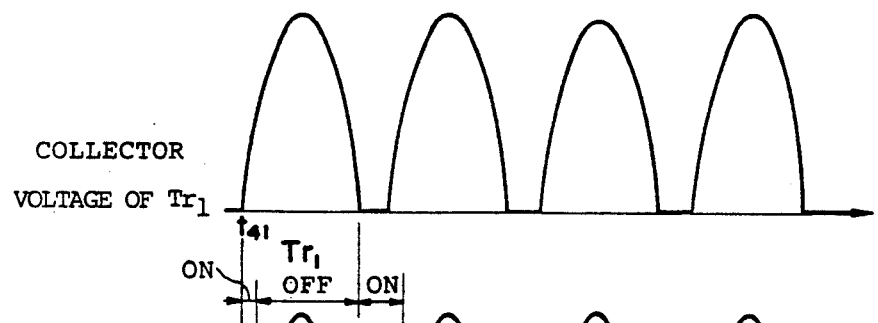
Fig.13b COLLECTOR VOLTAGE OF $Tr_1$
Fig.13c EMITTER VOLTAGE OF $Tr_1$
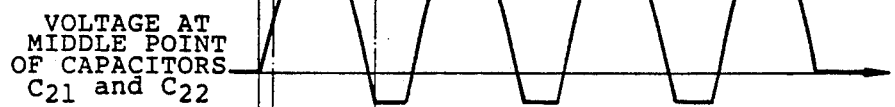
Fig.13d VOLTAGE AT MIDDLE POINT OF CAPACITORS $C_{21}$ and $C_{22}$
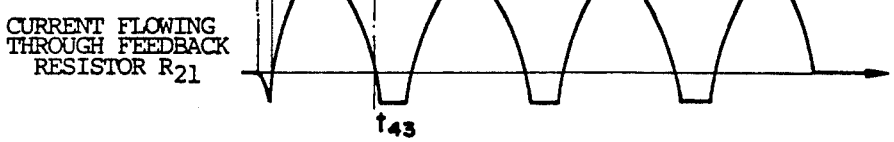
Fig.13e CURRENT FLOWING THROUGH FEEDBACK RESISTOR $R_{21}$ Fig. 16
PRIOR ART
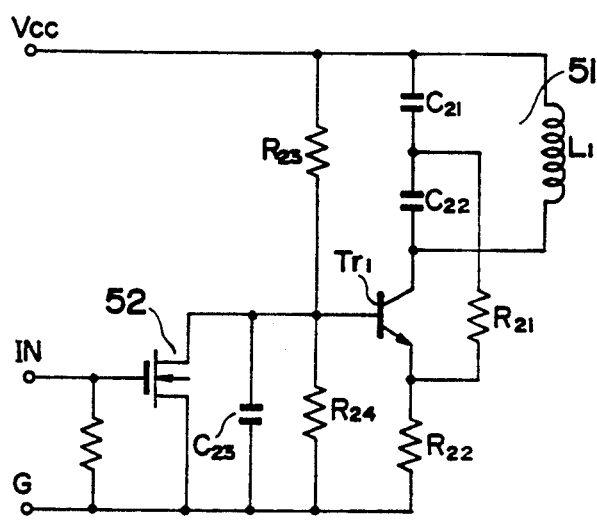
PRIOR ART
Fig. 17a  INPUT VOLTAGE OF FET 52
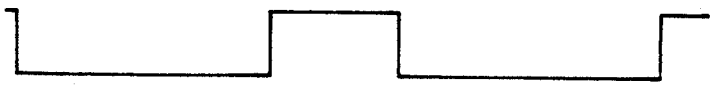
Fig. 17b  VOLTAGE OF COIL $L_1$
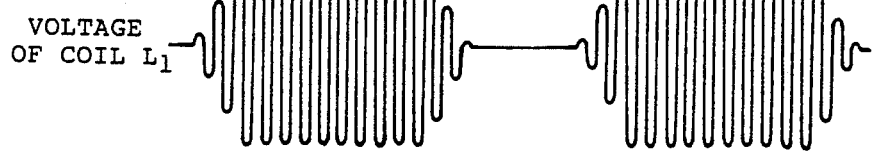

DATA COMMUNICATION APPARATUS

This application is a continuation of application Ser. No. 07/641,806, filed Jan. 16, 1991, now abandoned which is a continuation of Ser. No. 07/280,498, filed Dec. 6, 1988 now abandoned.

BACKGROUND OF THE INVENTION

1. Field of the Invention

The present invention relates to a data communicating apparatus for communicating data between first and second devices which are contactlessly closely arranged or which approach each other by using an induction electromagnetic field and to an oscillator which is used in the communicating apparatus and transmits data by intermittently oscillating.

2. Prior Art Statement

Hitherto, for instance, as shown in JP-A-62-63050, there has been proposed a data transmitting apparatus in which a data storing device to store tool data is provided for a tool shank or the like of a machine tool, the data is serially transmitted and written from a data input/output apparatus into the data storing device, or the content written is read out. In such a data transmitting apparatus, the data communication between the data input/output apparatus and the data storing device is performed by using predetermined high frequency signals by frequency shift keying (FSK) modulating those high frequency signals.

However, according to the conventional data transmitting apparatus, each of the data storing device and data input/output apparatus needs a PLL circuit or the like to demodulate the FSK signal, so that a large electric power consumption is required. There is a case where an AC voltage induced from the data input/output (I/O) apparatus is rectified and the data storing device uses the resultant rectified voltage as a power source. In such a case, if the electric power consumption is large, data communication cannot be performed unless the induced voltage is high, so that there is a drawback in that a distance at which the data communication can be performed is short. On the other hand, when the data storing device has a battery, there is a drawback in that the life of the battery is short. The applicant of the present invention has already proposed a system in Japanese Patent application 62-52692 in which in order to reduce the electric power consumption of the data storing device, when data is transmitted from the data storing device to the data I/O apparatus, a resonance frequency of a resonance circuit is discontinuously changed on the basis of the transmission data. In such a case, although the electric power consumption of the data storing device can be reduced, since a communication range is determined by a coupling coefficient between the data storing device and the data I/O apparatus, there is a drawback in that even if an output from the data I/O apparatus is enlarged, the communication distance cannot be increased.

On the other hand, as shown in FIG. 16, there has been known a Colpits oscillator which is an LC type oscillator for transmitting a signal by the electromagnetic induction by intermittent oscillation. In the diagram, a collector of a transistor $Tr_1$ is connected to one end of an LC resonance circuit 51 consisting of a coil $L_1$ and capacitors $C_{21}$ and $C_{22}$. A feedback resistor $R_{21}$ is connected between a middle point of the coils $C_{21}$ and $C_{22}$ and an emitter of the transistor $Tr_1$. The emitter of the transistor $Tr_1$ is connected to the ground through an emitter resistor $R_{22}$. A predetermined DC voltage is applied to one end of the resonance circuit 51. A middle point of resistors $R_{23}$ and $R_{24}$ to divide the power source voltage is connected to the base of the transistor $Tr_1$. A predetermined voltage is applied as a bias to the base of the $Tr_1$ and the base is connected to the ground by a capacitor $C_{23}$ in an AC manner. An FET 52 for switching is provided to intermittently apply and shut off the terminal voltage of the base of the $Tr_1$. The FET 52 is intermittently turned on/off in accordance with an input signal and the base of the oscillating transistor $Tr_1$ is connected to the ground or a predetermined bias voltage is applied thereto. Thus, as shown in FIGS. 17a and 17b, the oscillation can be intermittently performed in correspondence to the input voltage which is applied to the FET 52.

However, in such an oscillator, since the base voltage of the oscillating transistor is controlled and the oscillation is started and stopped, the leading time of the oscillation is slow and the trailing time thereof is also slow, so that even if the supply of the input signal is stopped, the attenuating vibration remains and the amplitude gradually decreases. Thus, there is a drawback such that the oscillation cannot be intermittently performed at a high speed and a data transmission speed cannot be set to a high speed.

SUMMARY OF THE INVENTION

The present invention is made in consideration of the foregoing problems in the conventional data transmitting apparatus and it is a technical subject of the invention to enlarge a communication distance by mutually transmitting a transmission signal by using a carrier of a predetermined frequency and by improving a transmission/reception efficiency.

Another object of the invention is to make the oscillator of the second device unnecessary.

Still another object of the invention is to improve the S/N ratio upon data transmission.

Still another object of the invention is to provide an apparatus which can perform full-duplex data communication by using a carrier of a predetermined frequency.

The invention is made in consideration of the foregoing problems of the conventional oscillator and it is a technical subject of the invention to enable the oscillation to be started and stopped in an extremely short time in response to an input signal.

According to the invention, the above objects are accomplished by a data communicating apparatus for performing a half-duplex data transmission of serial data between a first device and a second device. The first device comprises: an oscillator which has a first coil arranged on a surface which can face the second device; transmission pulse generating means for generating transmission pulse signals of a predetermined period having a first or second duty ratio in correspondence to a transmission data signal upon data transmission and a predetermined third duty ratio upon data reception, and for giving the transmission pulse signal of a predetermined period to the oscillator to cause the oscillator to intermittently perform the oscillation; a first resonance circuit which has a resonance frequency that is substantially equal to an oscillating frequency of the oscillator and which include a second coil arranged on the surface that can face the second device; reception gate signal generating means for receiving a signal corresponding to a transmission pulse of the transmission pulse generating means and for generating a reception gate signal having a timing when the oscillation of the oscillator is stopped; a detecting circuit for detecting an electromagnetic induction signal obtained in the first resonance circuit for a time when the reception gate signal generating means is given; a sample and hold circuit to sample an output of the detecting circuit at a predetermined timing of the reception gate signal; and a first comparator to discriminate a signal held by the sample and hold circuit by a predetermined level. The second device comprises: a second resonance circuit which has a resonance frequency that is substantially equal to the oscillating frequency of the oscillator of the first device and which includes a third coil arranged on the surface that can face the first device; a detecting circuit to detect a signal obtained in the second resonance circuit; a second comparator for reproducing the transmission pulse signal by discriminating a detection output of the detecting circuit by a predetermined threshold level; data demodulating means for demodulating the transmission data signal by the transmission pulse signals of the first and second duty ratios on the basis of an output of the second comparator upon data reception from the first device; and reverberation control means which has switching elements connected between the second resonance circuit and the ground and controls a reverberation that is caused in the second resonance circuit by turning on/off the switching elements in correspondence to the transmission data at the timing for the stop of the oscillation of the oscillator on the basis of the transmission pulse signal of the third duty ratio which is derived from the second comparator upon data transmission to the first device.

According to the present invention having the above feature, in the first device, the oscillation of the oscillator is intermittently performed at a predetermined period and the duty ratio is changed upon transmission, thereby allowing the binary signal to be transmitted to the second device. In the second device, by detecting the signal transmitted and discriminating on the basis of the predetermined threshold level, the transmission pulse signal is demodulated. Further, the original transmission data signal is demodulated on the basis of the duty ratio of that signal. When data is transmitted from the second device to the first device, in the first device, the oscillation of the oscillator is intermittently performed by the predetermined third duty ratio and the switching elements which are provided for the resonance circuit of the second device are intermittently turned on/off in response to the transmission data signal at the stop of the oscillation, thereby controlling the reverberation obtained in the resonance circuit of the first device. The first device generates the reception gate signal of the stop period of the oscillation on the basis of the transmission pulse signal which is given to the oscillator and fetches only the reverberation by the reception gate signal, thereby detecting the reverberation. The signal is sampled at a predetermined timing of the reception gate signal and given to the first comparator and discriminated on the basis of the predetermined threshold level, thereby demodulating the transmission signal which is derived from the second device.

As described above, according to the invention, the half-duplex data transmission of serial data is executed between the first and second devices by using electromagnetic coupling. Since the data demodulating means of the second device demodulates the signal on the basis of the pulse width, there is no need to use a PLL circuit or the like and the circuit arrangement is relatively simple and electric power consumption is small. Therefore, when the electric power for the second device is obtained from the first device, the transmission distance can be set to a long distance because of the small electric power consumption. When data is transmitted from the second device to the first device since the reverberation of the signal obtained from the first device is controlled on the basis of the transmission data, if an oscillation output which is given from the first device to the second device is set to a large value, the reverberation level can be raised in association with it. Therefore, since the resonance signal of the reverberation derived from the first device also increases, the data transmission distance can be enlarged. On the other hand, since the resonance frequency of the resonance circuit provided for each of the first and second devices is set to be substantially coincident with the oscillating frequency of the oscillator, there are advantages such that the high efficient data transmission can be performed and the S/N ratio ca be also improved.

The second device in the data communicating apparatus according to the invention further has; a clock discriminating circuit for discriminating an oscillation signal obtained in the second resonance circuit on the basis of a comparison signal of the second comparator and for shaping the discriminated oscillation signal; and above data demodulating means for demodulating the transmission data signal by the transmission pulse signals of the first and second duty ratios on the basis of an output of the second comparator and a clock signal of the clock discriminating circuit upon reception of the data from the first device. According to the invention, in the clock discriminating circuit, the oscillation signal of the oscillator obtained from the first device is shaped to form a clock, the duty ratio is discriminated on the basis of the clock signal, and thereby demodulating the original transmission data signal. Therefore, a clock generator is unnecessary in the second device and the circuit construction is simplified.

The first device in the data communicating apparatus according to the invention further has: resonance control means which is connected in parallel with the first resonance circuit and which has a series connection circuit comprising of a resistor and an analog switch that is turned on/off by the reception gate signal and which controls the Q of the first resonance circuit.

When data is transmitted from the second device to the first device, the oscillator of the first device is intermittently driven. When the oscillator is driven, the Q of the first resonance circuit is reduced on the basis of an output of the reception gate signal generator and only when the reverberation is received, the Q is raised, so that only the reverberation can be accurately detected in the second resonance circuit. Therefore, data can be transmitted from the second device to the first device at a high S/N ratio.

According to the invention, there is provided a data communicating apparatus for performing a data transmission of serial data between a first device and a second device. The first device comprises: an oscillator which has a first coil arranged on a surface that can face the second device; transmission pulse generating means for continuously generating a transmission pulse signal of a first or second duty ration, for switching the first and second duty ratios in correspondence to the transmission data signal upon data transmission, for giving the transmission pulse signal to the oscillator, and thereby for intermittently performing the oscillation of the oscillator; a first resonance circuit which has a resonance frequency that is substantially equal to an oscillating frequency of the oscillator and includes a second coil arranged on the surface that can face the second device; reception gate signal generating means for receiving a signal corresponding to a transmission pulse of the transmission pulse generating means and for generating a reception gate signal having a timing at the stop of the oscillation of the oscillator; a detecting circuit to detect an electromagnetic induction signal obtained in the first resonance circuit for a time when the reception gate signal is given from the reception gate signal generating means; a sample and hold circuit to sample an output of the detecting circuit at a predetermined timing of the reception gate signal; and a first comparator to discriminate a signal held by the sample and hold circuit by a predetermined level. The second device comprises: a second resonance circuit which has a resonance frequency that is substantially equal to an oscillating frequency of the oscillator of the first device and includes a third coil arranged on the surface that can face the first device; a detecting circuit to detect a signal obtained in the second resonance circuit; a second comparator to reproduce the transmission pulse signal by discriminating the detection output on the basis of a predetermined threshold level; data demodulating means for demodulating the transmission data signal by the transmission pulse signals having the first and second duty ratios on the basis of an output of the second comparator upon reception of the data from the first device; and reverberation control means which has switching elements connected between the second resonance circuit and the ground and controls a reverberation caused in the second resonance circuit by turning on/off the switching elements in correspondence to the transmission data at the timing for the stop of the oscillation of the oscillator on the basis of the transmission pulse signal derived from the second comparator upon data transmission to the first device.

According to the invention having the above feature, the first device always generates a transmission pulse of the first or second duty ratio on the basis of the transmission data. Upon data transmission, the duty ratio is changed by the transmission data and the oscillation of the oscillator is intermittently performed and the data is transmitted to the second device. The second device detects the transmitted signal and discriminates by the predetermined threshold level, thereby demodulating the transmission pulse signal. Further, the original transmission data signal is demodulated on the basis of the duty ratio of the signal. When data is transmitted from the second device to the first device, in the first device, the oscillation of the oscillator is intermittently performed on the basis of the transmission pulse signal of the first or second duty ratio of an arbitrary data series. When the oscillation is stopped, the switching elements which are provided for the resonance circuit of the second device are turned on or off in accordance with the transmission data signal, thereby controlling the reverberation derived in the resonance circuit of the first device. The first device generates a reception gate signal for the period of time when the oscillation of the oscillator stops and takes out only the reverberation by the reception gate signal and detects the reverberation. The detected signal is sampled at a predetermined timing of the reception gate signal and given to the first comparator and discriminated on the basis of the predetermined threshold level, thereby demodulating the transmission signal transmitted from the second device.

According to the invention, the data transmission can be performed between the first and second devices by using the electromagnetic coupling. When data is transmitted from the second device to the first device, the data transmission is executed by transmitting an arbitrary signal from the first device, so that full-duplex data transmission can be executed by changing the transmission signal of the first device by the transmission data. Therefore, by sequentially transmitting the data which were mutually transmitted from the other device, the transmission content can be checked every bit.

According to the invention, there is provided an oscillator which is used in a data communicating apparatus to transmit a signal by the intermittent oscillation and comprises: a parallel resonance circuit comprising of resonance elements including a coil and a capacitor; and a transistor whose collector is connected to one end of the parallel resonance circuit and which is fed back to a base from a middle point provided for the resonance elements of the resonance circuit, wherein the oscillator has a switching element which is connected between the coil and the capacitor of the resonance circuit and opens or closes the resonance circuit, and the oscillation is intermittently executed by the switching element.

According to the invention having the above feature, the switching element is serially connected to the resonance circuit and the intermittent oscillation is controlled by the switching element. Since a current is directly supplied to the resonance circuit from a power source by closing the switching element, the leading edge can be made sharp. By opening the switching element, the charges in the capacitor of the resonance circuit are discharged through the transistor, so that the oscillation is stopped in an extremely short time.

Therefore, according to the invention, the leading time of the oscillation and the stop time of the oscillation can be made extremely fast. Therefore, if the invention is applied to the oscillator of the data communicating apparatus for transmitting a signal by the intermittent oscillation, there are advantages such that the data transmission can be performed at a high speed and the signal transmission can be accurately executed.

BRIEF DESCRIPTION OF THE DRAWINGS

FIGS. 10a to 11l show another embodiment;

FIGS. 10a to 10g are time charts showing waveforms in respective sections when data is transmitted from the write/read control unit to the ID unit;

FIGS. 11a to 11l are time charts showing waveforms in respective sections when a signal is transmitted from the ID unit to the write/read control unit;

FIGS. 13a to 13e are waveform diagrams showing waveforms in respective sections at the start of the oscillation;

FIG. 16 is a circuit diagram showing an example of a conventional oscillator; and FIGS. 17a and 17b are waveform diagrams showing an oscillation output to a control signal.

DETAILED DESCRIPTION OF THE PREFERRED EMBODIMENTS

Figure 1:
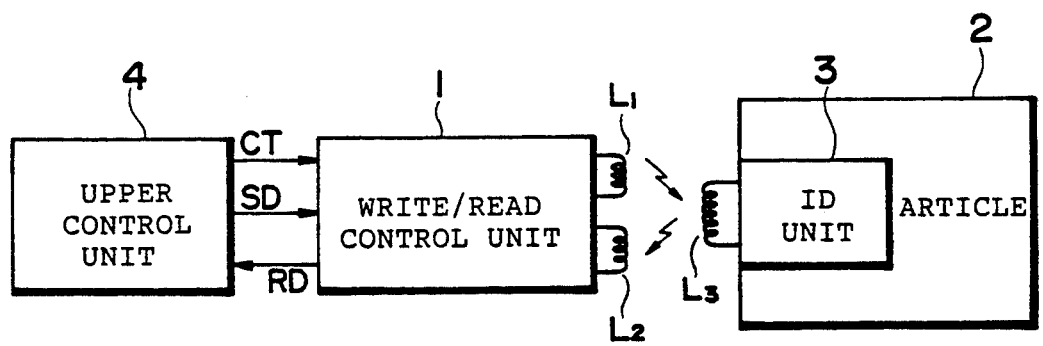
FIG. 1 is a block diagram showing a whole arrangement of an article identifying system according to an embodiment of a data communicating apparatus of the present invention.

FIG. 1 is a block diagram showing a whole arrangement of an article identifying system to which a data communicating apparatus according to an embodiment of the present invention is applied. In the diagram, the data communicating apparatus has a write/read control unit 1 as a first device and an ID unit 3 as a second device which is attached to an article 2 or the like. In general, the write/read control unit 1 is fixedly provided and when an article is moved, the ID unit 3 attached to the article 1 approaches the write/read control unit 1.

The write/read control unit 1 has first and second coils $L_1$ and $L_2$ at positions where the first and second coils can face the ID unit 3 when the ID unit 3 approaches the unit 1. The ID unit 3 has a third coil $L_3$ at a position where the third coil can face the first and second coils. For instance, the write/read control unit 1 is further connected to an upper control unit 4. After the control unit 4 transmitted a transmission control signal CT to the write/read control unit 1, the control unit sends transmission data SD and reads reception data RD which is obtained from the write/read control unit 1.

Figure 2:
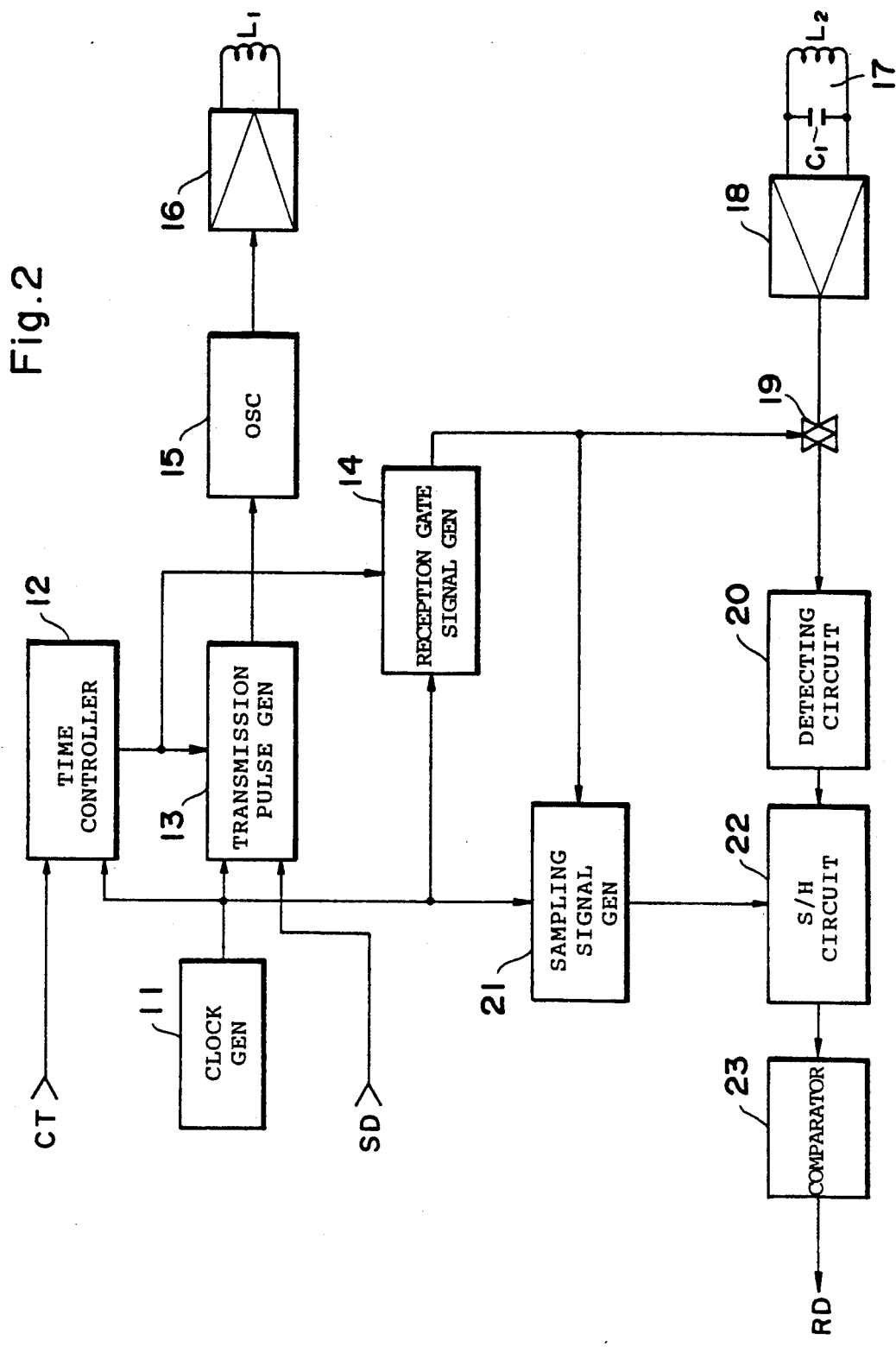
FIG. 2 is a block diagram showing an arrangement of a write/read control unit.

As shown in a detailed block diagram of FIG. 2, the write/read control unit 1 has a clock generator 11 to generate a predetermined clock signal, a time controller 12 to generate a timing signal on the basis of the clock signal, and a transmission pulse generator 13. When the transmission control signal CT is given from the upper control unit 4, the time controller 12 sends a transmission/reception switching signal to the transmission pulse generator 13 and a reception gate generator 14. After the transmission control signal CT is sent, the control unit 4 transmits the transmission data SD to the transmission pulse generator 13. When the transmission/reception switching signal from the time controller 12 indicates the transmission mode, the transmission pulse generator 13 counts the clocks generated from the clock generator 11 for a predetermined period of time and generates a transmission pulse signal having a first or second duty ratio (e.g., 30% or 70%) in accordance with the transmission data SD at a predetermined period of time T. An output of the transmission pulse generator 13 is input to an oscillator 15. When the transmission/reception switching signal indicates the reception mode, the generator 13 generates a transmission pulse signal of a third duty ratio (for instance, 50%). The oscillator 15 oscillates a signal of a predetermined frequency only when the transmission pulse signal is given from the transmission pulse generator 13. An oscillation output of the oscillator 15 is supplied to the first coil $L_1$ for transmission through an amplifier 16.

The write/read control unit 1 also has the second coil $L_2$ for reception. A capacitor $C_1$ is connected in parallel with the coil $L_2$, thereby constructing a first resonance circuit 17 which resonates with the oscillating frequency of the oscillator 15. An induced voltage developed across the first resonance circuit 17 is applied to an amplifier 18. The amplifier 18 amplifies the induced voltage and gives an output to a detecting circuit 20 through an analog switch 19. When the transmission/reception switching signal generated from the time controller 12 indicates the reception mode, the reception gate generator 14 generates a reception gate signal which is delayed by a predetermined time corresponding to, e.g., one clock from the trailing edge of the transmission pulse. The reception gate signal is given as a gate signal to the analog switch 19.

The clock signal of the clock generator 11 and reception gate signal of the reception gate generator 14 is also given to a sampling signal generator 21. The generator 21 gives a signal of a predetermined timing of the reception gate signal, for instance, a signal of one clock just sample and hold circuit 22. The detecting circuit 20 detects the signal obtained through the analog switch 19, thereby obtaining an integration signal or its envelope signal. The detection signal is input to the sample and hold circuit 22. The sample and hold circuit 22 holds the input signal on the basis of the sampling signal. An output of the sample and hold (S/H) circuit 22 is input to a first comparator 23. The comparator 23 obtains a binary signal by discriminating the signal held on the basis of a predetermined threshold level. An output of the comparator 23 is input as the reception signal RD to the upper control unit 4.

Figure 3:
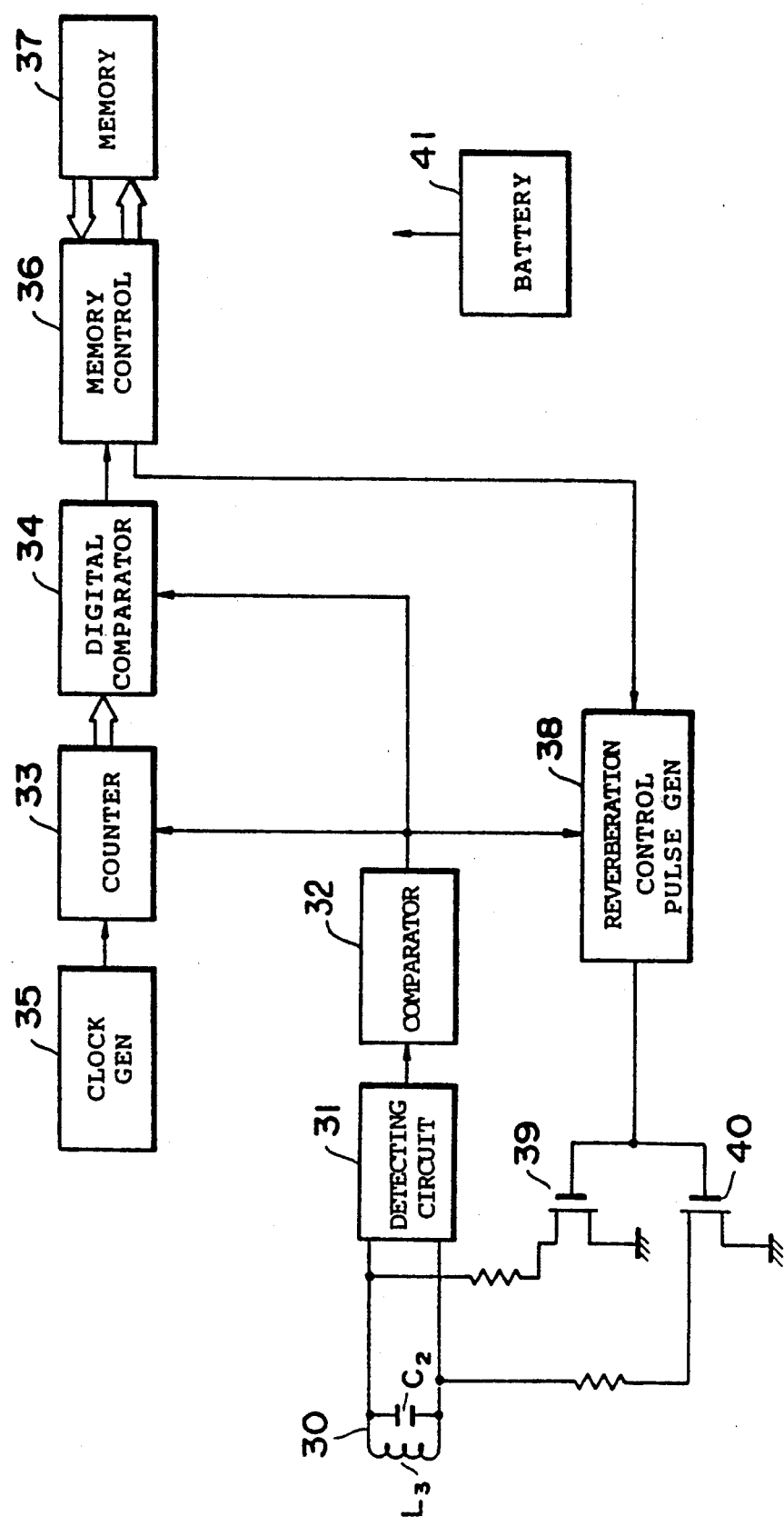
FIG. 3 is a block diagram showing an arrangement of an ID unit.

As shown in FIG. 3, the ID unit 3 has a second resonance circuit 30 consisting of a coil $L_3$ and a capacitor $C_2$ provided on the surface which faces the write/read control unit 1. An induced voltage across the second resonance circuit 30 is given to a detecting circuit 31. The detecting circuit 31 detects the input signal and its output is given to a second comparator 32. A predetermined threshold level is set in the comparator 32. The detection output is discriminated by the predetermined threshold level. An output of the comparator 32 is given to both of a counter 33 and a digital comparator 34. The counter 33 is reset by a leading edge of the output of the comparator 32. The counter 33 counts the clock signals from a clock generator 35 which are input when the output (transmission pulse) of the comparator 32 is held at the H level. A count value is given to the digital comparator 34. The digital comparator 34 compares the count value of the counter 33 with a predetermined value at the timing of the trailing edge of the output of the comparator 32, thereby obtaining the "L" or "H" level output depending on whether the count value exceeds the predetermined value or not. An output of the digital comparator 34 is input to a memory control unit 36. A memory 37 serving as memory means of the ID unit 3 is connected to the memory control unit 36. Signals which are transmitted from the write/read control unit 1 are data and command. The memory control unit 36 writes the given data into the memory, 37 or reads out the data from the memory 37 on the basis of the command. An output of the memory control unit 36 is given to a reverberation control pulse generator 38. On the basis of the transmission data to be transmitted to the write/read control unit 1 which was read out of the memory 37 by the memory control unit 36 at the timing when the output of the comparator 32 is at the L level, the reverberation control pulse generator 38 generates a reverberation control pulse of a predetermined width when the transmission data is at the L level. FETs 39 and 40 as switching elements are connected through resistors between both ends of the resonance circuit 30 and the ground, respectively. The FETs 39 and 40 function to connect both ends of the resonance circuit 30 to the ground on the basis of the reverberation control pulse from the generator 38, respectively. In the embodiment, the ID unit 3 has a battery 41 as shown in the diagram and a power source is supplied from the battery 41 to each section.

The counter 33, digital comparator 34, and clock generator 35 construct data demodulating means for discriminating the transmission data SD on the basis of the output of the comparator 32 having the first or second duty ratio, that is, the transmission pulse signal which is given from the write/read control unit 1. The reverberation control pulse generator 38 and FETs 39 and 40 as the switching elements for connecting both ends of the resonance circuit 30 to the ground construct reverberation control means for controlling the reverberation of the resonance circuit 30.

Figure 4:
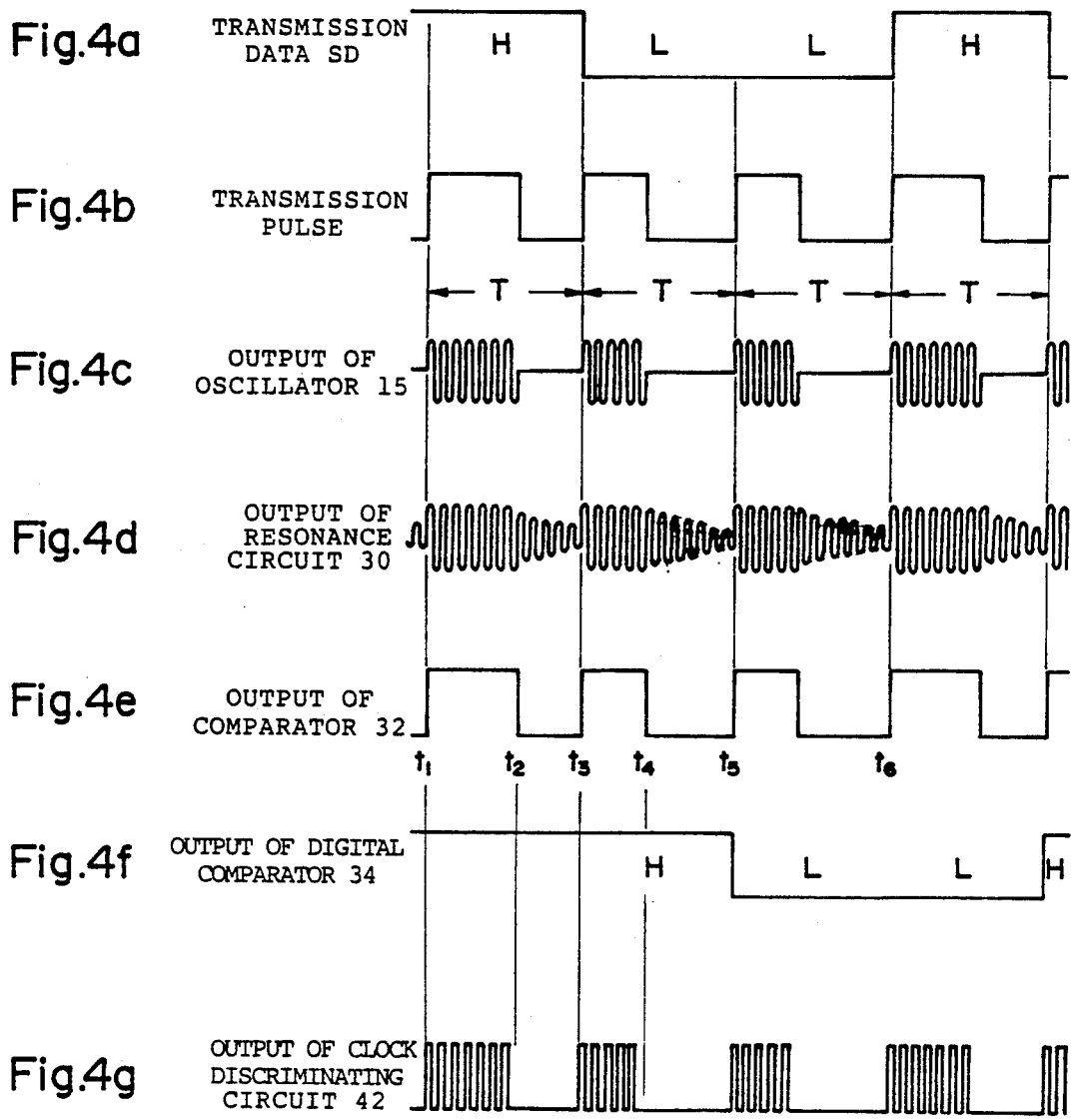
FIGS. 4a to 4g are time charts showing waveforms in respective sections when data is transmitted from the write/read control unit to the ID unit.

The operation of the embodiment will now be described with reference to time charts. First, when a signal is transmitted from the write/read control unit 1 to the ID unit 3, the transmission control signal CT is sent from the upper control unit 4 to the time controller 12. Thus, the time controller 12 gives the transmission/-reception switching signal to the transmission pulse generator 13. After that, as shown in FIG. 4a, the signal of the transmission data SD (for instance, "HLLH" as shown in the diagram) is sent from the upper control unit 4 to the transmission pulse generator 13. Thus, as shown in FIG. 4b, the transmission pulse generator 13 generates the transmission pulse signal of the first or second duty ratio which corresponds to the H or L logic level of the transmission data and is different from each other at a predetermined period T from times $t_1$, $t_3$, $t_5$, and $t_6$. The oscillation of the oscillator 15 is intermittently performed by the transmission pulse signal as shown in FIG. 4c. Therefore, when the ID unit 3 approaches, as shown in FIG. 4d, a signal of a predetermined amplitude is obtained across the resonance circuit 30 for the driving time of the oscillator 15, that is, for the time intervals from $t_1$ to $t_2$, $t_3$ to $t_4$, etc. and the signal is attenuated after that. The signal is then detected by the detecting circuit 31 and compared by the comparator 32 on the basis of the predetermined threshold level. Therefore, the same signal as the transmission pulse signal as shown in FIG. 4e is obtained by the comparator 32. The signal is input to the counter 33 and digital comparator 34. When the counting operation is started from time $t_1$, a count value larger than a predetermined value is obtained in the counter 33 at the time point $t_2$ when the output of the comparator 32 trails (the transmission pulse of the first duty ratio corresponding to the H level is obtained). When the counting operation is started from time $t_3$, a count value lower than the predetermined value is derived in the counter 33 at the time point $t_4$ (the transmission pulse of the second duty ratio corresponding to the L level is obtained). Therefore, the digital comparator 34 discriminates the count value at times $t_2$ and $t_4$ and outputs a signal indicative of the result of the discrimination to the memory control unit 36 at a timing which is delayed by one period T than the transmission data SD as shown in FIG. 4f. In this manner, the data can be transmitted from the write/read control unit 1 to the ID unit 3. Different from the FSK signal, since the signal of a predetermined frequency is merely intermittently supplied or shut off, by making the resonance frequency of the resonance circuit 30 coincide with the oscillating frequency of the oscillator 15, the high efficient data transmission can be performed. By increasing the output of the oscillator 15 of the write/read control unit 1, the voltage level induced in the ID unit 3 rises, so that the communication distance can be enlarged by the oscillation output.

Figure 5:
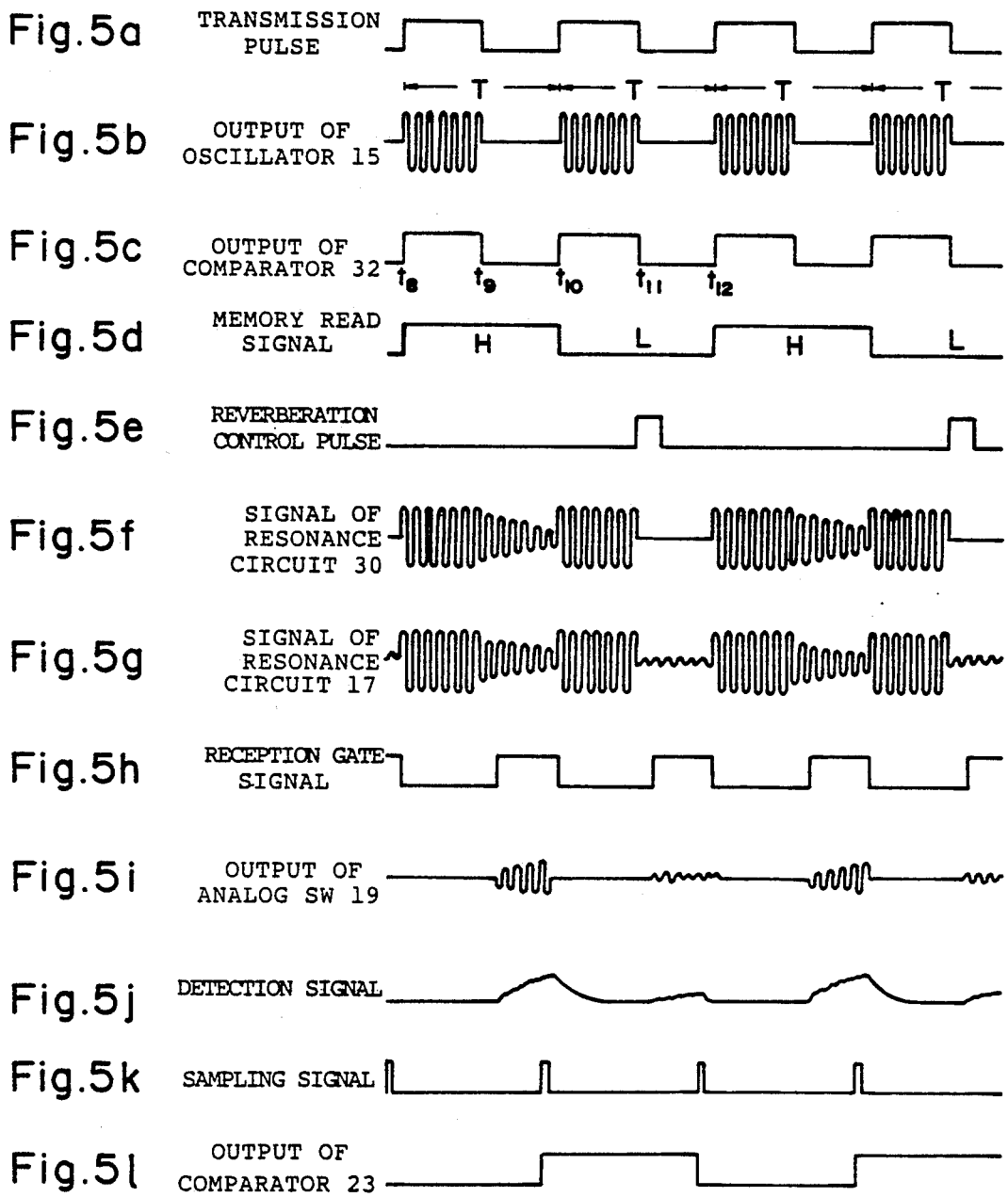
FIGS. 5a to 5l are time charts showing waveforms in respective sections when a signal is transmitted from the ID unit to the write/read control unit.

Next, when data is transmitted from the ID unit 3 to the write/read control unit 1, the transmission/reception switching signal of the time controller 12 of the write/read control unit 1 is switched to the reception mode. The transmission pulse generator 13 generates the transmission pulse signal of a predetermined period T having a predetermined third duty ratio of, e.g., 50% as shown in FIG. 5a. Thus, since the oscillation of the oscillator 15 is periodically intermittently performed, an oscillation signal as shown in FIG. 5b is transferred from the coil $L_1$ to the ID unit 3. Therefore, the comparator 32 outputs a read clock signal of the duty ratio of 50% as shown in FIG. 5c. On the basis of the read clock signal, the data signal is read out of, the memory 37 by the memory control unit 36. FIG. 5d shows an example of the signal in the case where the data read out by the memory control unit 36 is "HLHL". The data signal is input to the reverberation control pulse generator 38. Only when the logic level of the data signal is at the L level, the generator 38 generates a reverberation control pulse of a predetermined width as shown in FIG. 5e at the time point of the trailing edge of the output signal of the comparator 32. The FETs 39 and 40 are turned on by the reverberation control pulse signal. Therefore, when the FETs 39 and 40 are in the off state (the data signal is at the H level), an attenuation signal is caused in the resonance circuit 30 as shown after time $t_9$ and the like in FIG. 5f. However, since both ends of the resonance circuit 30 are connected to the ground after time $t_{11}$ when the FETs 39 and 40 are turned on (the data signal is at the L level), a reverberation hardly occurs in the resonance circuit 30 of the ID unit 3. On the other hand, although the signal induced in the resonance circuit 17 by the driving of the coil $L_1$ of the write/read control unit 1 has a predetermined high amplitude level for the time intervals from $t_8$ to $t_9$, $t_{10}$ to $t_{11}$, etc. when the oscillator 15 is driven, the reverberation of a low level remains in correspondence to the reverberation of the resonance circuit 30 of the ID unit 3 for the subsequent time intervals from $t_9$ to $t_{10}$, $t_{11}$ to $t_{12}$, etc.. For a predetermined time interval shorter than the time interval at which the transmission pulse is at the L level, the reception gate signal which is set to the H level as shown in FIG. 5h is generated from the reception gate signal generator 14. The signal induced in the resonance circuit 17 is supplied to the detecting circuit 20 through the analog switch 19 which is closed only for the period of time corresponding to the H level reception gate signal. Just before the reception gate signal trails, as shown in FIG. 5k, the sampling signal is given to the sample and hold circuit 22 and the output of the detecting circuit 20 is sampled and held, Therefore, the output of the S/H circuit 22 is discriminated by the comparator 23 on the basis of the threshold level, so that a signal as shown in FIG. 5l, that is, the memory read signal of FIG. 5d is transferred to the write/read control unit 1 with a delay time of only the transmission period T.

In the embodiment, the counter to count the clocks and the digital comparator have been used as the data demodulating means of the ID unit 3. However, various constructions for demodulating the pulse width into the binary, signal can be also used. For instance, the data demodulating means can be constructed by an integrating circuit to integrate the signal obtained in the comparator and a comparator to discriminate the integration output by a predetermined threshold level.

Although the embodiment shows an example in which an internal battery has been provided as a power source of the ID unit 3, a rectifying and smoothing circuit is connected to the resonance circuit 30 of the ID unit 3 and a DC voltage which is derived from the resonance circuit can be supplied as a power source to each block. In such a case, it is preferable to construct in a manner such that in order to make the average periods of the transmission pulses constant, the transmission data SD which is given from the control unit 4 is further Manchester encoded and the Manchester encoded signal, that is, the "HL" signal with respect to the H logic level or the "LH" signal with regard to the L logic level is given as transmission data to the transmission pulse generator 13, thereby transmitting the transmission data. With this method, although the data transmitting speed becomes ½ as compared with the case where the transmission data SD is not Manchester encoded, the average value of the driving times of the oscillator 14 does not fluctuate depending on the time and the oscillation signal of a predetermined average value is given. Consequently, the data transmission can be performed without fluctuating the DC voltage of the ID unit 3.

An example in which the clock generator 35 (FIG. 3) is omitted from the ID unit 3 will now be described.

Figure 6:
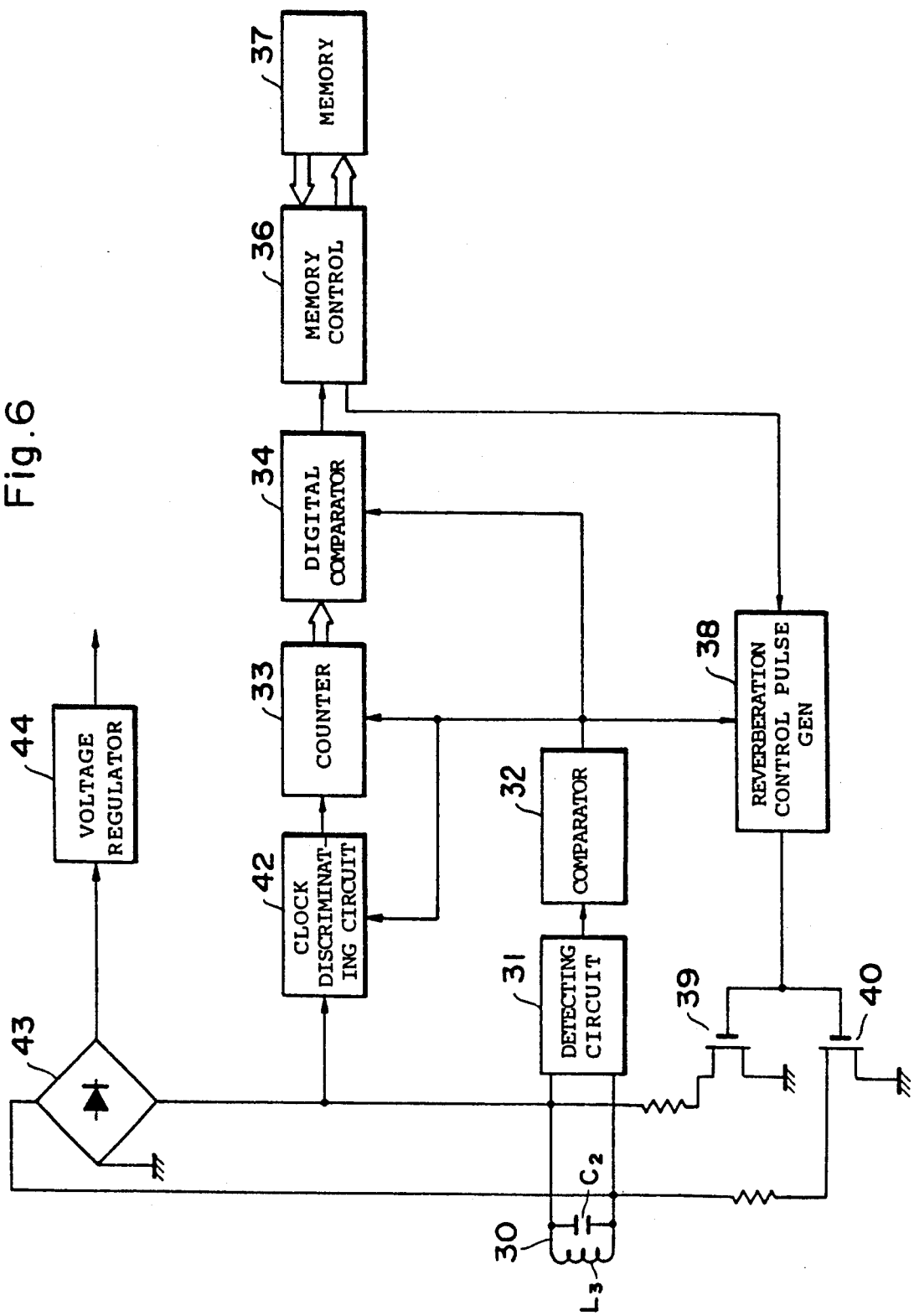
FIG. 6 is a block diagram showing an arrangement of another example of the ID unit.

FIG. 6 shows a modification of the ID unit 3. In the diagram, the same parts and components as those shown in FIG. 3 are designated by the same reference numerals and their descriptions are omitted.

The induced voltage across the second resonance circuit 30 is given to the detecting circuit 31 and a diode bridge 43. The diode bridge 43 full-wave rectifies the induced voltage obtained in the resonance circuit 30 and gives to a voltage regulator 44. The voltage regulator 44 smoothes the rectified voltage and supplies as a constant voltage to each block in the ID unit 3. As mentioned above, a predetermined threshold level is set in the comparator 32. The detection output is discriminated by the threshold level. The output of the comparator 32 is given to a clock discriminating circuit 42, the counter 33, and the digital comparator 34. As shown in the diagram, an input terminal of the clock discriminating circuit 42 is connected to one end of the resonance circuit 30. When the transmission pulse is given, the clock of the oscillating frequency obtained in the resonance circuit 30 is detected by the circuit 42. The clock signal is input to the counter 33. The counter 33 counts the clock signal. A count value of the counter 33 is given to the digital comparator 34 as mentioned above.

Figure 7:
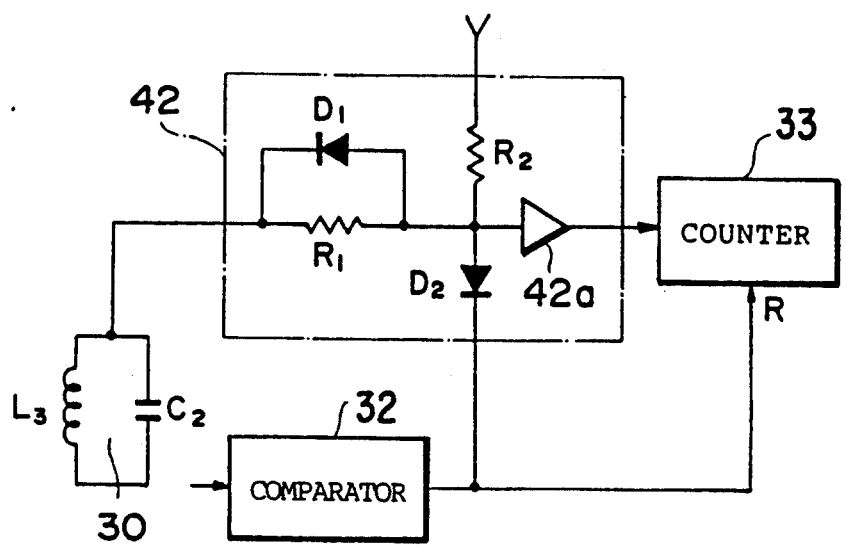
FIG. 7 is a circuit diagram showing a detailed construction of a clock discriminating circuit and its peripheral circuits.

A detailed construction of the clock discriminating circuit 42 will now be described with reference to FIG. 7. As shown in FIG. 7, one end of the resonance circuit 30 is connected to an input terminal of a buffer amplifier 42a through a parallel connection circuit of a resistor $R_1$ and a diode $D_1$ of the clock discriminating circuit 42. A pull-up resistor $R_2$ is connected between an input terminal of the buffer amplifier 42a and a power source terminal. A clamping diode $D_2$ is connected between the pull-up resistor $R_2$ and an output terminal of the comparator 32. When the output of the comparator 32 is at the L level, the diode $D_2$ fixes an input signal of the buffer amplifier 42a to an almost zero level. The resistor $R_1$ is provided so as not to reduce the amplitude of the signal of the resonance circuit 30 during that period of time. On the other hand, the diode $D_1$ is provided to make the input signal of the buffer amplifier 42a quickly trail, a time constant due to an input capacitance of the buffer amplifier 42a and the resister $R_1$ is set to a small value, and thereby preventing that Q of the resonance circuit 30 largely decreases.

The diode $D_2$ is turned off for a time interval from $t_1$ to $t_2$ when the output signal of the comparator 32 is at the H level. A signal of a predetermined amplitude shown in FIG. 4d is given to the buffer amplifier 42a through the resistor $R_1$. The clock signal is extracted as shown in FIG. 4g and given to the counter 33 and counted.

In the embodiment, the oscillation signal obtained from the write/read control unit is rectified and used as a power source of the ID unit 3. Therefore, as mentioned above, it is preferable to construct in a manner such that the transmission data SD which is given from the control unit 4 is further Manchester encoded such that the average periods of the transmission pulse become constant, and the Manchester encoded signal is given as transmission data to the transmission pulse generator 13, thereby transmitting the transmission data.

An explanation will now be made with respect to a modification of the write/read control unit 1 which can improve the S/N ratio in the data transmission from the ID unit 3 to the write/read control unit 1.

Figure 8:
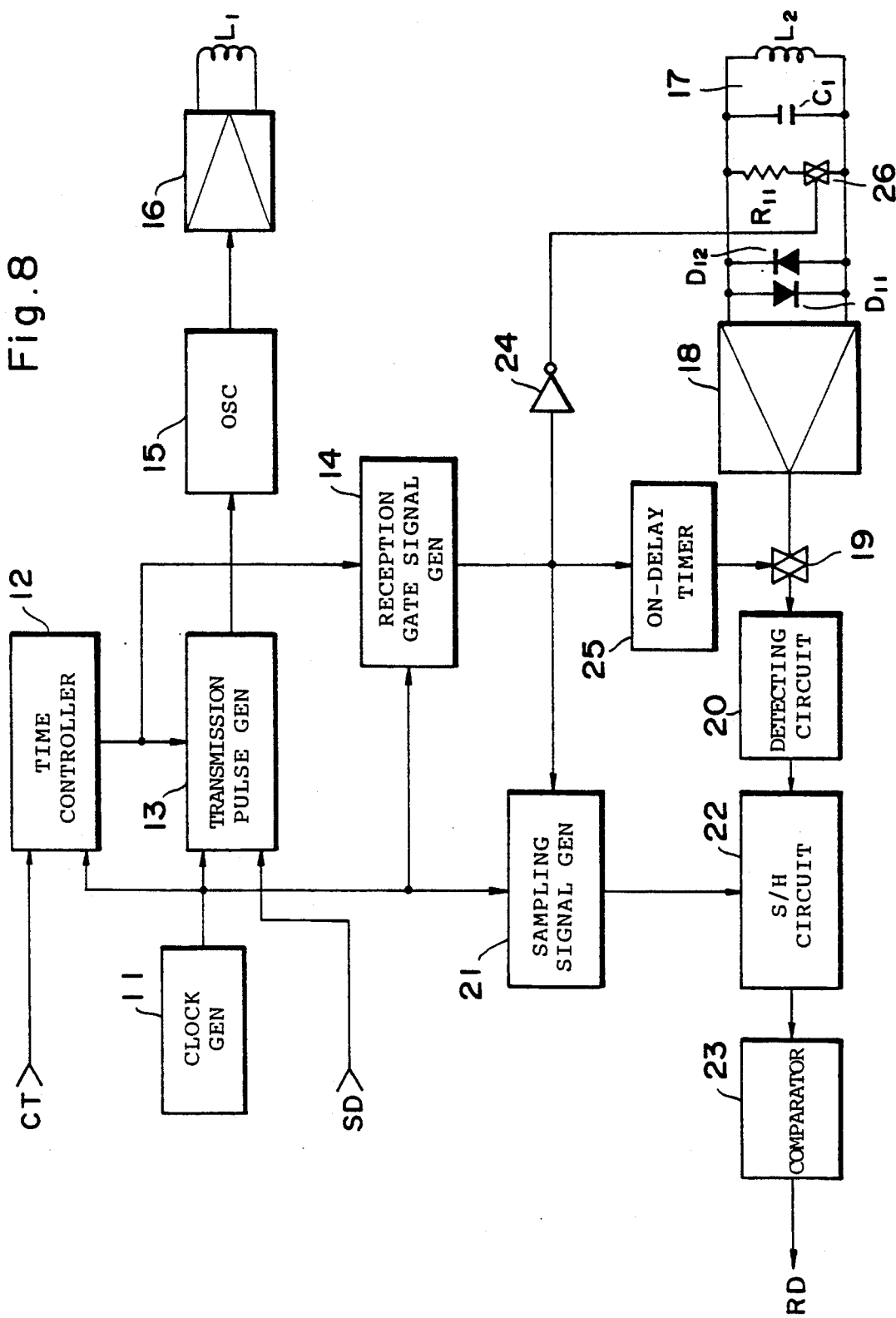
FIG. 8 is a block diagram showing another example of the write/read control unit.

FIG. 8 shows the modification of the write/read control unit 1. In the diagram, the same parts and components as those shown in FIG. 2 are designated by the same reference numerals and their descriptions are omitted.

A series circuit of a resistor $R_{11}$ and an analog switch 26 is connected across the resonance circuit 17 consisting of the coil $L_2$ and capacitor $C_1$. Diodes $D_{11}$ and $D_{12}$ are connected in the opposite directions to both ends of the resonance circuit 17 in order to limit the amplitude of the signal to a constant value. The analog switch 26 is driven by an inverter 24 to invert the output of the reception gate signal generator 14 and switches the Q of the resonance circuit 17 to a state (Q dump state) in which the resistor $R_{11}$ is connected and a state in which the resistor $R_{11}$ is not connected. The output across the resonance circuit 17 is given to the amplifier 18.

As mentioned above, the reception gate signal generated from the reception gate signal generator 14 is inverted and given as a control signal to the analog switch 26. The reception gate signal is also input to the analog switch 19 through an on-delay timer 25 having a micro delay time.

The resistor $R_{11}$ and analog switch 26 provided in parallel for the resonance circuit 17 construct resonance control means for controlling the Q of the resonance circuit 17.

Figure 9:
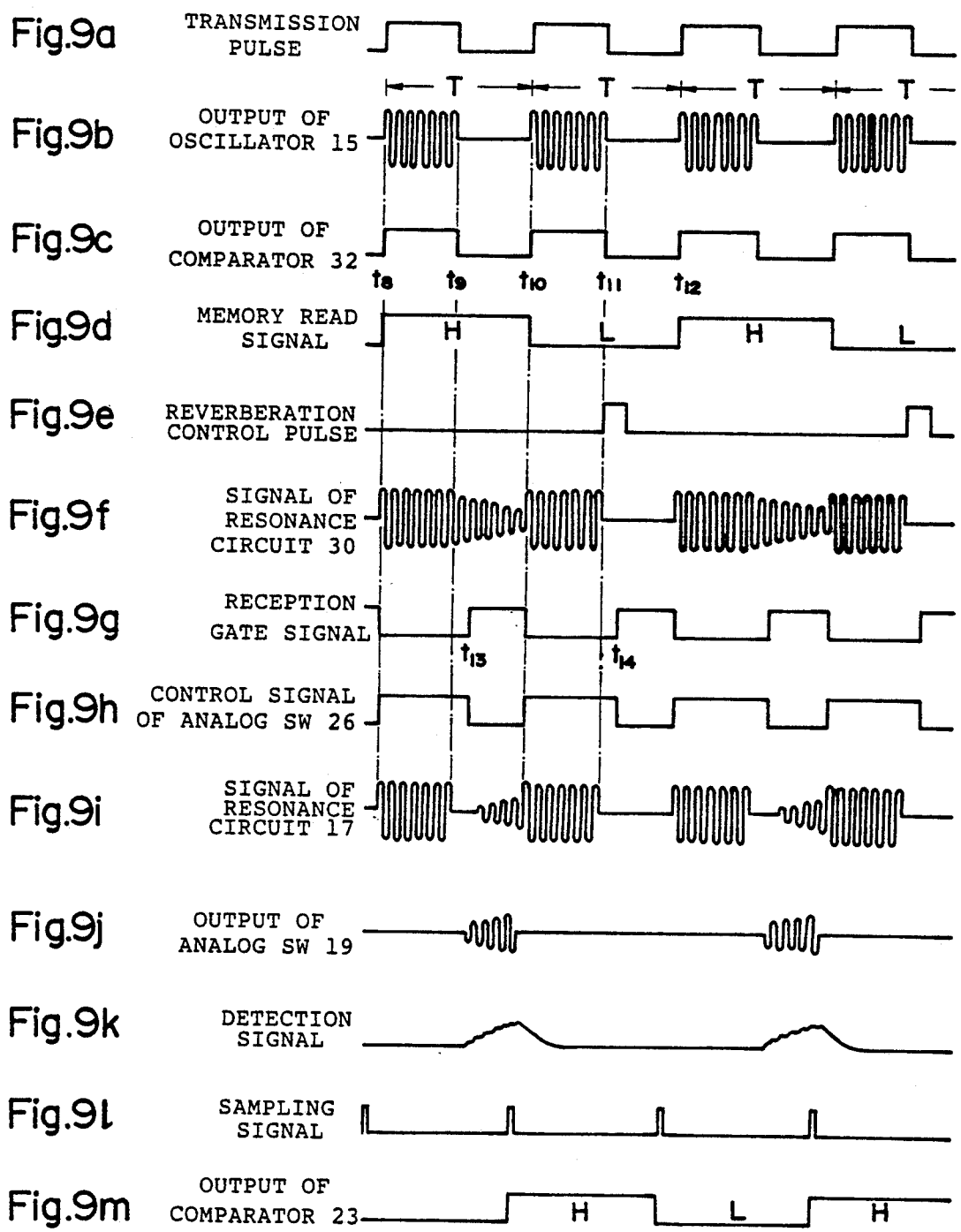
FIGS. 9a to 9m are time charts showing waveforms in respective sections when a signal is transmitted from the ID unit to the write/read control unit.

The operation to transmit data from the ID unit 3 to the write/read control unit 1 will now be described with reference to FIGS. 9a to 9m. FIGS. 9a to 9m except FIG. 9h are substantially the same as FIGS. 5a to 5l.

When data is transmitted from the ID unit 3 to the write/read control unit 1, the transmission/reception switching signal of the time controller 12 of the write/read control unit 1 is first switched to the reception mode. The transmission pulse generator 13 generates a transmission pulse signal of a predetermined period T of the predetermined third duty ratio of, e.g., 50% as shown in FIG. 9a. Thus, the oscillation of the oscillator 15 is periodically intermittently performed, so that an oscillation signal as shown in FIG. 9b is transferred from the coil $L_1$ to the ID unit 3. Therefore, the comparator 32 outputs a read clock signal of a duty ratio of 50% as shown in FIG. 9c. On the basis of the read clock signal, the data signal is read out of the memory 37 by the memory control unit 36. FIG. 9d shows an example of a signal in the case where the "HLHL" signal is read out by the memory control unit 36. The data signal is input to the reverberation control pulse generator 38. Only when the logic level of the data signal is at the L level, the generator 38 generates a reverberation control pulse of a predetermined width as shown in FIG. 9e at a time point of the trailing edge of the output signal of the comparator 32. The FETs 39 and 40 are turned on by the reverberation control pulse signal. Therefore, when the FETs 39 and 40 are in the off state (the data signal is at the H level), an attenuation signal occurs in the resonance circuit 30 as shown after time $t_9$ and the like in FIG. 9f. However, after time $t_{11}$ when the FETs 39 and 40 are turned on (the data signal is at the L level), both end of the resonance circuit 30 is connected to the ground, so that a reverberation hardly occurs in the resonance circuit 30 of the ID unit 3. On the other hand, in the write/read control unit 1, a reception gate signal as shown in FIG. 9g is generated from the reception gate signal generator 14. The inverted output of the reception gate signal as shown in FIG. 9h is input to the analog switch 26 of the resonance circuit 17. Therefore, the resistor $R_{11}$ is connected to the resonance circuit 17 for the time intervals from $t_8$ to $t_{13}$ and from $t_{10}$ to $t_{14}$ and the Q is dumped, so that the Q is set to a low value. For time interval from $t_{13}$ to $t_{10}$, since the resistor $R_{11}$ is not connected, the Q of the resonance circuit 17 is high and the reverberation caused in the resonance circuit 30 can be easily detected. The analog switch 19 is closed with a predetermined micro delay time than time $t_{13}$. Consequently, as shown in FIGS. 9i and 9j, the reverberation can be induced across the resonance circuit 17 for a time interval from $t_{13}$ to $t_{10}$ and the signal is supplied to the detecting circuit 22 through the analog switch 19. Just before the signal as shown in FIGS. 9k and 9l is extinguished, the sampling signal is given to the sample and hold circuit 22. Therefore, since the output of the S/H circuit 22 is discriminated by the comparator 23 on the basis of the threshold level, a signal as shown in FIG. 9m is output from the comparator 23. That is, a memory read signal similar to the signal of FIG. 9d is delayed by only the transmission period T and transferred to the write/read control unit 1.

An explanation will now be made with respect to an embodiment of an apparatus which can perform the full-duplex data transmission between the write/read control unit 1 and the ID unit 3. Although the circuit arrangements shown in FIGS. 1 to 3 are used as they are, the operation differs as will be explained hereinbelow. Only the different points will be described.

In FIG. 2, the upper control unit 4 converts the transmission signal into a modified biphase code, which will be explained hereinlater, and gives as the transmission data SD to the transmission pulse generator 13. When the transmission/reception switching signal obtained from the time controller 12 indicates the transmission mode, the transmission pulse generator 13 counts the clocks from the clock generator 11 and generates a transmission pulse signal of the first or second duty ratio such that the duty ratio is set to 7:5 when the transmission data SD is at the H level and 3:5 when it is at the L level. The output is given to the oscillator 15. The oscillator 15 oscillates a signal of a predetermined frequency only when the transmission pulse signal is given from the transmission pulse generator 13. The oscillation output is given through the amplifier 16 to the first coil $L_1$ for transmission.

In FIG. 3, the digital comparator 34 compares the count value of the counter 33 with a predetermined count value in response to the leading edge of the output of the comparator 32 and obtains the L or H output depending on whether the count value exceeds the predetermined count value or not. The counter 33, digital comparator 34, and clock generator 35 construct data demodulating means for discriminating the transmission data SD on the basis of the count value of the counter 33, that is, the transmission pulse signal which is given from the write/read control unit 1.

Figure 10:
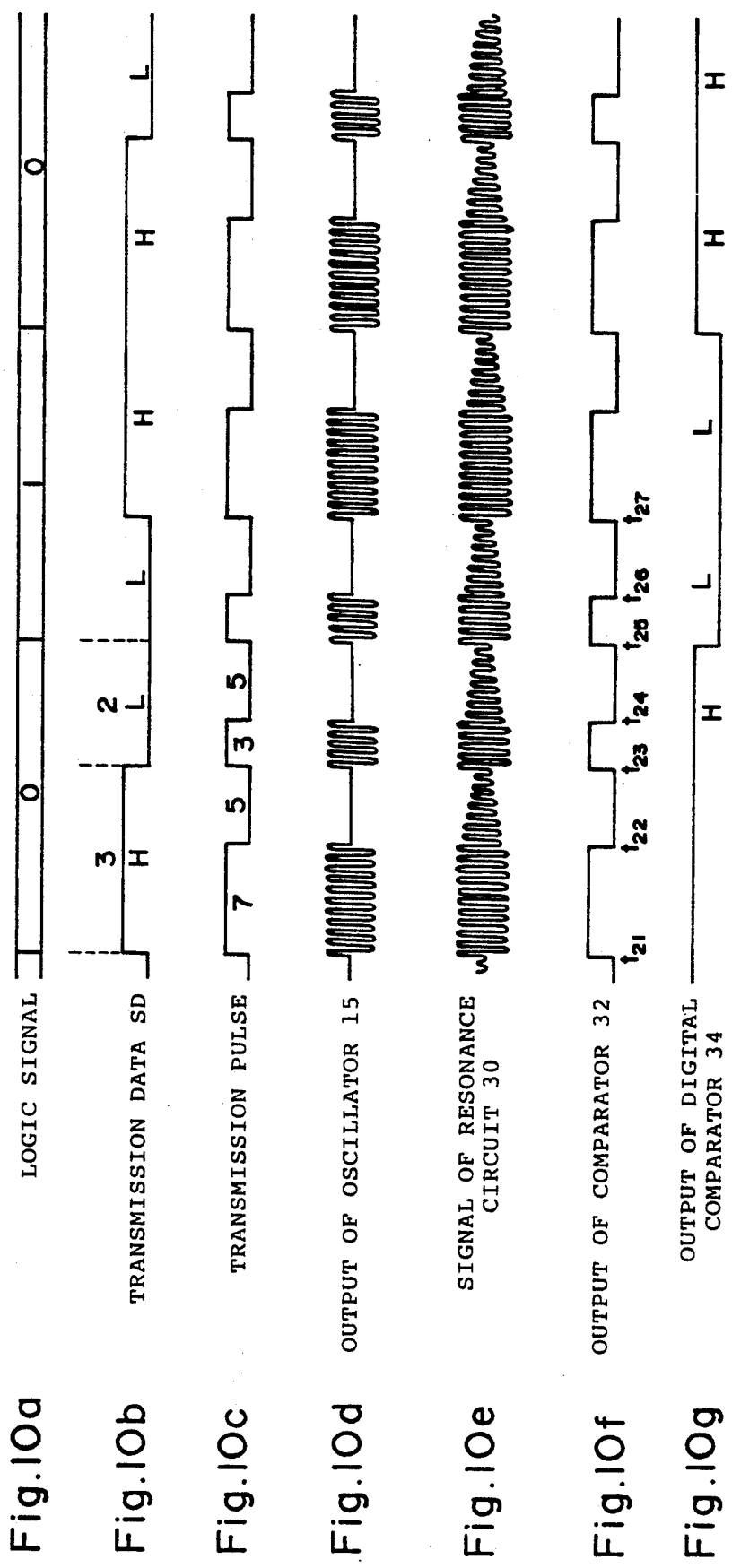

The operation of the embodiment will now be described with reference to time charts of FIGS. 10a to 10g and 11a to 11l. When a signal is transmitted from the write/read control unit 1 to the ID unit 3, the transmission control signal CT is sent from the upper control unit 4 to the time controller 12. Thus, the time controller 12 supplies the transmission/reception switching signal to the transmission pulse generator 13. Thereafter, the transmission data SD as a modified biphase code shown in FIG. 10b is given from the upper control unit 4 in correspondence to transmission data shown in FIG. 10a. The transmission data SD is a signal which changes to "HL" when the transmission data is at the "0" logic level and to "LH" when the transmission data is at the "1" logic level. It is assumed that the time interval of the H level and the time interval of the L level change at a ratio of 3:2. The transmission data SD is given to the transmission pulse generator 13. Accordingly, the transmission pulse generator 13 generates transmission pulses having the first and second duty ratios of the ratios of 7:5 and 3:5 for the time intervals from $t_{21}$ to $t_{23}$ and from $t_{23}$ to $t_{25}$ corresponding to the transmission data "HL" as shown in FIG. 10c. The oscillation of the oscillator 15 is intermittently executed by the transmission pulse signal generated as shown in FIG. 10d. Therefore, when the ID unit 3 approaches, a signal of a predetermined amplitude which will be attenuated later is derived across the resonance circuit 30 as shown in FIG. 10e for the driving period of time of the oscillator 15, that is, for the time intervals from $t_{21}$ to $t_{22}$, $t_{23}$ to $t_{24}$, $t_{25}$ to $t_{26}$, etc. The signal is detected by the detecting circuit 31 and compared with a predetermined threshold level. Thus, the same signal as a transmission pulse signal as shown in FIG. 10f is derived from the comparator 32. The signal is then given to the counter 33 and digital comparator 34. When the counting operation is started from time $t_{21}$, a count value larger than the predetermined value is obtained in the counter 33 at the time point $t_{22}$ when the output of the comparator 32 trails. When the counting operation is started from time $t_{23}$, a count value lower than the predetermined value is obtained at the time point $t_{24}$. Consequently, the digital comparator 34 discriminates the count value at times $t_{22}$ and $t_{24}$ and outputs the same signal as the transmission data at a timing which is delayed by one period than the transmission data SD as shown in FIG. 10g. In this manner, data can be transmitted from the write/read control unit 1 to the ID unit 3. Since the transmission pulse of the duty ratio of 7:5 for the H level of the transmission data SD and the duty ratio of 3:5 for the L level of the transmission data SD is used, the time intervals when the oscillator 15 outputs the oscillation output largely differ such as 7:3. Thus, the discrimination can be certainly executed without confusing those time intervals and the correct reception data can be derived.

Figure 11:
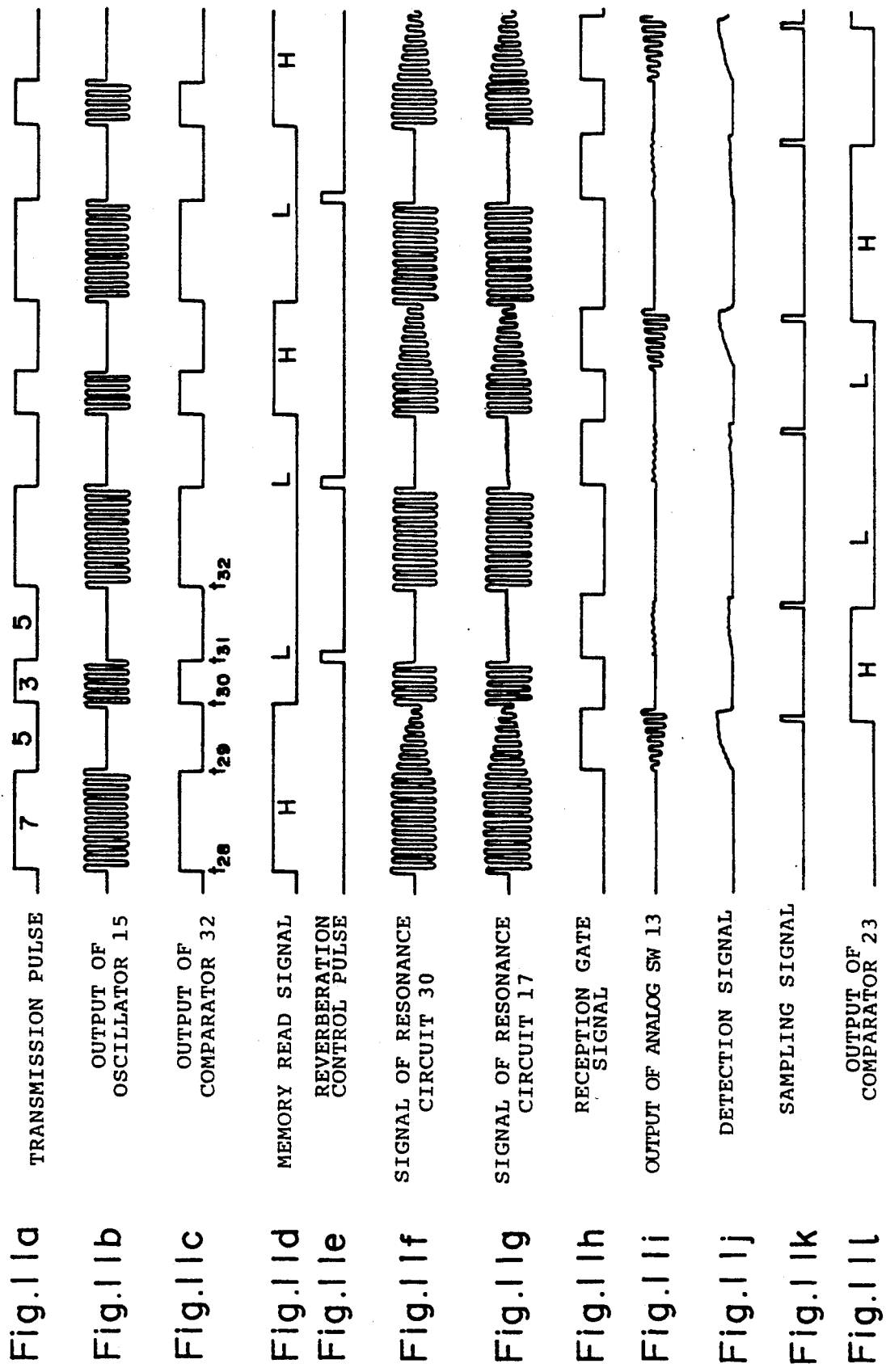

Next, when data is transmitted from the ID unit 3 to the write/read control unit 1, the transmission/reception switching signal of the time controller 12 of the write/read control unit 1 is switched to the reception mode. The transmission pulse generator 13 alternately generates the transmission pulse signals of the first and second duty ratios corresponding to arbitrary transmission data, e.g., "HLHL . . . " as shown in FIG. 11a. Thus, since the oscillation of the oscillator 15 is periodically intermittently executed, an oscillation signal as shown in FIG. 11b is transferred from the coil $L_1$ to the ID unit 3. Therefore, the comparator 32 outputs a read clock signal corresponding to the transmission pulse as shown in FIG. 11c. The data signal is read out of the memory 37 by the memory control unit 36 on the basis of the read clock signal. FIG. 11d shows an example of the signal in the case where the signal read out by the memory control unit 36 is "HLLHL . . . " and the signal is input to the reverberation control pulse generator 38. The generator 38 outputs a reverberation control pulse of a predetermined width as shown in FIG. 11e in response to the trailing edge of the output signal of the comparator 32 when the logic level of the read signal is at the L level. The reverberation control pulse signal is given to the FETs 39 and 40 and the FETs are turned on. Therefore, when the FETs 39 and 40 are in the off state, an attenuation signal occurs in the resonance circuit 30 as shown at time interval after time $t_{29}$, etc. in FIG. 11f. However, since both ends of the resonance circuit 30 are connected to the ground after time $t_{31}$ when the FETs 39 and 40 are turned on, a reverberation hardly occurs in the resonance circuit 30 of the ID unit 3. On the other hand, the signal obtained in the resonance circuit 17 of the write/read control unit 1 has a predetermined high amplitude level for the time intervals from $t_{28}$ to $t_{29}$, $t_{30}$ to $t_{31}$, etc. when the oscillator 15 is driven. However, the reverberation of a low level remains or does not remian in dependence on the presence or absence of the reverberation in the resonance circuit 30 of the ID unit 3 for the subsequent time intervals from $t_{29}$ to $t_{30}$, $t_{31}$ to $t_{32}$, etc.. The reception gate signal is generated from the reception gate signal generator 14 as shown in FIG. 11h at a predetermined period shorter than the period when the transmission pulse is at the L level. The reverberation signal is supplied to the detecting circuit 20 through the analog switch 19 which is closed for only the period of time when the reception gate signal is generated. Just before the reception gate signal trails, the sampling signal is input to the sample and hold circuit 22 as shown in FIG. 11k. Since the output of the S/H circuit 22 is compared with the threshold value by the comparator 23, a signal as shown in FIG. 11l, that is, a memory read signal similar to the signal of FIG. 11d is delayed by the transmission period and the delayed signal is transferred to the write/read control unit 1.

In the embodiment, the operation in the case of alternately performing the data transmission between the ID unit 3 and the write/read control unit 1 has been described. However, when data is transmitted from the ID unit 3 to the control unit 1, as shown in FIG. 11a, the transmission pulse can be also formed on the basis of the actual transmission data to be transmitted from control unit 1 to ID unit 3, so that the data transmission between the ID unit 3 and the write/read control unit 1 can be simultaneously performed by the full-duplex communication. Consequently, when data is transmitted from the write/read control unit 1, by returning the data received by the ID unit from the ID unit 3 with the delay time of one period, the data is checked and the data transmission can be certainly accomplished. In a manner similar to the above, even when transmitting data from the ID unit 3, by immediately returning the received data from the write/read control unit 1, the reliability in the data transmission can be improved.

In the embodiment, when data is transmitted from the write/read control unit 1 to the ID unit 3, the data is transmitted by using the modified Manchester code. However, the transmission signal can be also directly transmitted as transmission data. In such a case, data can be transmitted at a high speed as compared with the case where the Manchester code is used.

A preferred practical example of the oscillator 15 (including the amplifier 16) will now be described as a last example.

Figure 12:
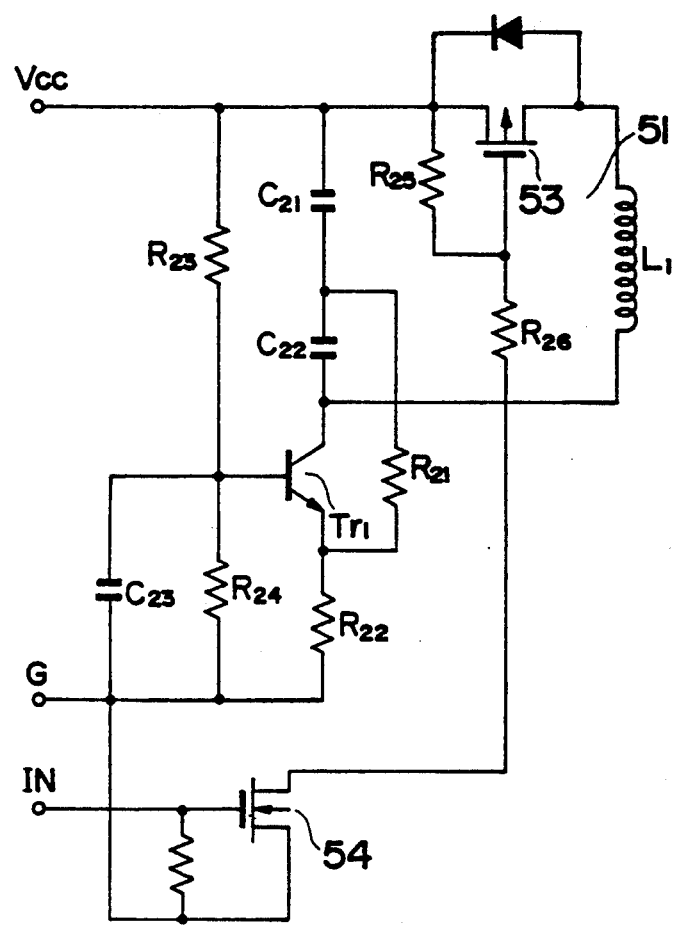
FIG. 12 is a circuit diagram of an oscillator according to an embodiment of the invention.

FIG. 12 is a circuit diagram showing an oscillator which is used as the oscillator 15. In the diagram, the same parts and components as those in the conventional apparatus shown in FIG. 16 are designated by the same reference numerals. Even in the embodiment, the resonance coil $L_1$ and capacitors $C_{21}$ and $C_{22}$ are also provided and construct the resonance circuit 51. One end of the resonance circuit 51 is connected to the collector of the transistor $Tr_1$. The middle point of the capacitors $C_{21}$ and $C_{22}$ is connected to the emitter of the transistor $Tr_1$ through the resistor $R_{21}$. The emitter resistor $R_{22}$ is connected between the emitter and the ground. A voltage dividing circuit consisting of biasing resistors $R_{23}$ and $R_{24}$ is connected to the base of the transistor $Tr_1$. A capacitor $C_{23}$ to connect the base to the ground in a high frequency manner is connected between the base and the ground in a manner similar to the conventional apparatus mentioned before. In the embodiment, a switching element consisting of an FET 53 is arranged between the coil $L_1$ and the capacitor $C_{21}$ in the resonance circuit 51 as shown in the diagram. A drain of the FET 53 is connected to the coil $L_1$ and a source is connected to both of the capacitor $C_{21}$ and the power source side. A resistor $R_{25}$ is connected between the gate and source of the FET 53. An FET 54 whose source is connected to the ground is provided as a switching element to turn on or off the FET 53. A drain of the FET 54 is connected to a gate of the FET 53 through a resistor $R_{26}$. A gate of the FET 54 is connected to a signal input terminal for intermittently executing the oscillation.

Figure 14A:
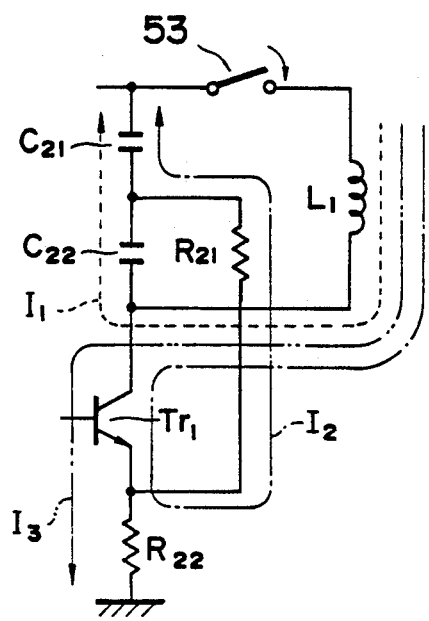
FIGS. 14a to 14d are diagrams showing a current direction of the oscillator.
Figure 14B:
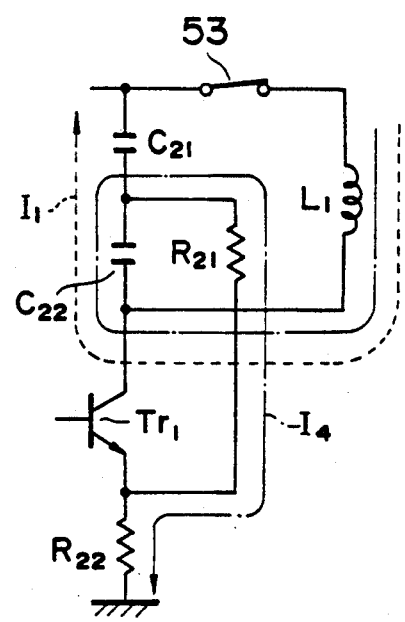
Figure 14C:
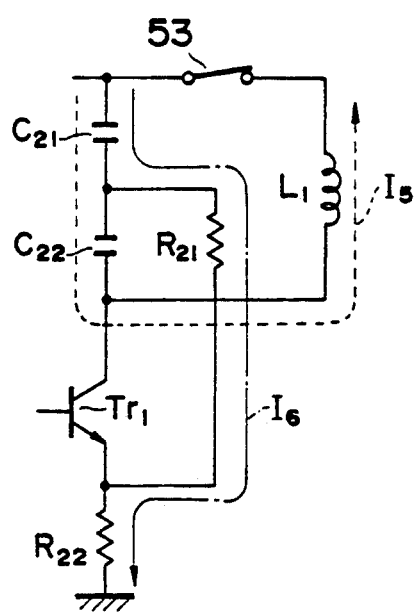
Figure 14D:
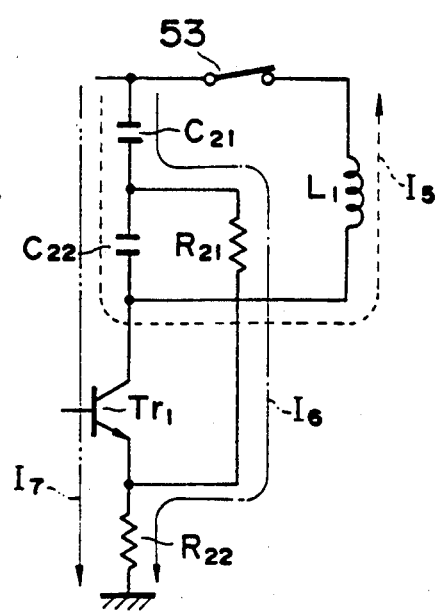

The operation of the embodiment will now be described. First, as shown in FIG. 13a, by giving an H level oscillation control signal to the gate of the FET 54 at time $t_{41}$, the FET 54 is turned on and the FET 53 is also made conductive. Thus, since a predetermined voltage is applied to the base of the transistor $Tr_1$, the transistor $Tr_1$ is soon turned on and a collector current flows through the transistor $Tr_1$. At this time, of the current flowing through the FET 53 shown as a switch in FIG. 14a and the coil $L_1$, a current $I_1$ passes through the capacitors $C_{22}$ and $C_{21}$ and is refluxed in the resonance circuit 51, a current $I_2$ flows into the collector of the transistor $Tr_1$ and flows as a resonance current to the resonance circuit 51 through the resistor $R_{21}$ and capacitor $C_{21}$ and a current $I_3$ passes through the transistor $Tr_1$ and resistor $R_{22}$ and flows to the ground. Therefore, as shown in FIGS. 13b and 13c, the collector voltage of the transistor $Tr_1$ suddenly rises and the emitter voltage also increases. Although the transistor $Tr_1$ is turned off at time $t_{42}$ when the emitter voltage exceeds the base voltage, the current flowing through the coil $L_1$ of the resonance circuit 51 becomes the current $I_1$ which is circulated through the capacitors $C_{22}$ and $C_{21}$ and a current $I_4$ flowing through the capacitor $C_{22}$, resistor $R_{21}$, and emitter resistor $R_{22}$ as shown in FIG. 14b, so that the collector potential and emitter potential of the transistor $Tr_1$ sebsequently rise as shown in FIGS. 13b and 13c. When the collector voltage reaches the level which is about twice as the power source voltage, the direction of the current flowing through the resonance circuit 51 is inverted. As shown in FIG. 14c, a current $I_5$ flows to the coil $L_1$ through the capacitors $C_{21}$ and $C_{22}$ from the power source. A current $I_6$ also flows through the capacitor $C_{21}$ and resistors $R_{21}$ and $R_{22}$. As shown in FIG. 13d, the emitter voltage of the transistor $Tr_1$ gradually decreases due to the voltage drop at the middle point of the capacitors $C_{21}$ and $C_{22}$. The transistor $Tr_1$ is again turned on at time $t_{43}$ when the emitter voltage is lower than the base voltage. Thus, in addition to the currents $I_5$ and $I_6$, a current $I_7$ flows through the capacitors $C_{21}$ and $C_{22}$, transistor $Tr_1$, and emitter resistor $R_{22}$ as shown in FIG. 14d and the vibration energy is applied to the capacitors $C_{21}$ and $C_{22}$. The current $I_6$ flowing from the capacitor $C_{21}$ through the resistors $R_{21}$ and $R_{22}$ decreases and the current $I_7$ increases, thereby reducing the collector voltage as shown in FIG. 13b. After the capacitors $C_{21}$ and $C_{22}$ were completely charged, the current direction is again reversed. As shown in FIG. 14a, the current flows from the power source through the coil $L_1$ to the capacitors $C_{22}$ and $C_{21}$ and transistor $Tr_1$ and the operating mode is returned to the original operation. Therefore, the oscillation rises at the maximum amplitude just after the switching element was turned on. The oscillation can be started at an extremely high speed.

Figures 15A, 15B:
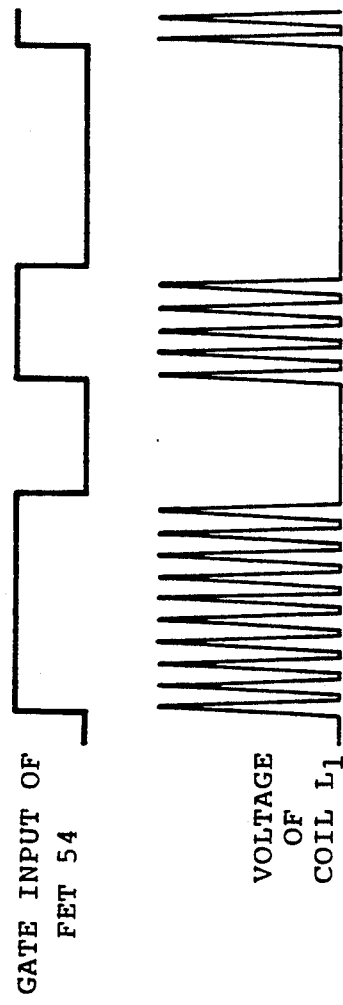
FIGS. 15a and 15b are diagrams showing an oscillating state to an oscillation control signal.

When the oscillation is stopped, the gate signal of the FET 54 as shown in FIG. 13a is set to the L level. Thus, since the FETs 54 and 53 are turned off, the current flowing through the resonance circuit 51 is shut off. If the FET 53 is turned off for the time interval when the transistor $Tr_1$ is in the ON state, none of the currents $I_1$, $I_2$, and $I_5$ flows through the resonance circuit 51, so that the charges in the capacitors $C_{21}$ and $C_{22}$ are immediately discharged through the transistor $Tr_1$ and the oscillation is stopped. If the FET 53 is turned off for the time interval when the transistor $Tr_1$ is in the OFF state, the transistor $Tr_1$ is once turned on when the emitter voltage of the transistor $Tr_1$ decreases. However, since the charges in the capacitors $C_{21}$ and $C_{22}$ are similarly discharge at that time, the oscillation is soon stopped. Consequently, when the gate input signal of the FET 54 is set to the L level, the oscillation is stopped within one period of the oscillation. Thus, as shown in FIGS. 15a and 15b, the oscillation is intermittently executed in correspondence to the gate input of the FET 54.

If the foregoing oscillator is used as the oscillator 15 in FIG. 2 or 8, when the oscillation of the oscillator is intermittently executed in accordance with the transmission pulses and the data transmission is executed, the oscillation is rapidly started or stopped, so that the data transmission speed can be improved. On the other hand, since the amplitude value of the oscillation does not gradually decrease, a possibility of the occurrence of the malfunction can be reduced. Since the foregoing communicating apparatus obtains the data signal from the ID unit 3 by using the reverberation during the stop of the oscillation, the reception mode can be soon set just after the oscillation of the oscillator was stopped. Therefore, the reliability in the data transmission can be also improved.

Although the embodiment has been described with respect to the Colpits oscillator, the invention can be also applied to a Hartley oscillator by using a capacitor is place of the coil $L_1$ of the oscillator and by using a coil having a middle point tap in place of the two capacitors $C_{21}$ and $C_{22}$.

We claim:

1. A data communicating apparatus for performing a half-duplex transmission of serial data between a first device and a second device, wherein
said first device comprises:
(a) an oscillator which has a first coil arranged on a surface which can face said second device;
(b) transmission pulse generating means for generating a transmission pulse signal of a predetermined period having a first or second duty ratio in correspondence to a transmission data signal upon data transmission and a predetermined third duty upon data reception, and for giving the transmission pulse signal of the predetermined period to said oscillator to cause said oscillator to intermittently oscillate in accordance with the duty ratio provided by said transmission pulse generating means;
(c) a first resonance circuit which has a resonance frequency that is substantially equal to an oscillating frequency of said oscillator and which includes a second coil arranged on the surface that can face the second device;
(d) a timing control circuit for providing a signal which causes said transmission pulse generating means to provide said transmission pulse signals to said oscillator;
(e) reception gate signal generating means connected to said timing control circuit for receiving said timing control circuit signal and for generating a reception gate signal having a timing corresponding to when the oscillation of said oscillator is stopped;
(f) a first detecting circuit switchingly connected to said first resonance circuit for detecting an electromagnetic induction signal obtained in said first resonance circuit for a time when said reception gate signal of said reception gate signal generating means switchingly connects said detecting circuit to said first resonance circuit;

(g) a sample and hold circuit for sampling an output of said first detecting circuit at a predetermined timing of the reception gate signal; and (h) a first comparator for comparing a signal held by said sample and hold circuit with a predetermined level, and said second device comprises:

(i) a second resonance circuit which has a resonance frequency that is substantially equal to the oscillating frequency of said oscillator of said first device and which includes a third coil arranged on a surface that can face said first device;

(ii) a second detecting circuit for detecting a signal obtained in said second resonance circuit;

(iii) a second comparator for reproducing a transmission pulse signal received by said second resonance circuit and transmitted by said first device by comparing a detection output of said second detecting circuit with a predetermined threshold level;

(iv) a data demodulating means for demodulating a transmission data signal represented by the first and second duty ratios of said transmission pulse signal on the basis of an output of said second comparator upon data reception from said first device; and (v) memory control means for writing/reading a transmission data signal in/out of a memory; and (vi) reverberation control means which has switching elements connected between said second resonance circuit and ground and which upon receiving transmission data from said memory control means controls a reverberation that is caused in said second resonance circuit by turning on/off said switching elements in correspondence to transmission data at the timing of the cessation of the oscillation of said oscillator on the basis of reception of a transmission pulse signal having the third duty ratio which is derived from said second comparator upon data transmission to said first device.

2. An apparatus according to claim 1, wherein said data demodulation means of said second device further comprises:

a clock discriminating circuit for discriminating an oscillation signal obtained in said second resonance circuit on the basis of a comparison signal of said second comparator and for generating a clock signal whereby said data demodulating means demodulates the transmission data signal represented by the transmission pulse signals of the first and second duty ratios on the basis of an output of said second comparator and said clock signal of said clock discriminating circuit upon reception of the data from said first device.

3. An apparatus according to claim 1, wherein said first device further comprises:

resonance control means which is connected in parallel with said first resonance circuit, which has a series connection circuit comprising a resistor and an analog switch that is turned on/off by the reception gate signal and which controls the Q of said first resonance circuit.

4. A data communicating apparatus for performing a data transmission of serial data between a first device and a second device, wherein said first device comprises (a) an oscillator which has a first coil arranged on a surface which can face said second device;

(b) transmission pulse generating means for continuously generating a transmission pulse signal of a first or second duty ratio, for switching said first and second duty ratios in correspondence to a transmission data signal upon data transmission, for giving the transmission pulse signal to said oscillator, and thereby for intermittently causing oscillation of said oscillator in accordance with said first or second duty ratio;

(c) a first resonance circuit which has a resonance frequency that is substantially equal to an oscillating frequency of said oscillator and includes a second coil arranged on the surface that can face said second device;

(d) a timing control circuit for providing a signal which causes said transmission pulse generating means to provide said transmission pulse signals to said oscillator;

(e) reception gate signal generating means connected to said timing control circuit for receiving said timing control signal and for generating a reception gate signal having a timing corresponding to the cessation of oscillation of said oscillator;

(f) a first detecting circuit connected to said first resonance circuit through a switch controlled by said reception gate signal in order to enable said first detecting circuit to detect an electromagnetic induction signal obtained in said first resonance circuit for a time when said reception gate signal is given from said reception gate signal generating means;

(g) a sample and hold circuit for sampling an output of said first detecting circuit at a predetermined timing of the reception gate signal; and (h) a first comparator for comparing a signal held by said sample and hold circuit with a predetermined level, and said second device comprises:

(i) a second resonance circuit which has a resonance frequency that is substantially equal to an oscillating frequency of said oscillator of said first device and includes a third coil arranged on a surface that can face said first device;

(ii) a second detecting circuit for detecting a signal obtained in said second resonance circuit;

(iii) a second comparator for reproducing a transmission pulse signal received by said first device and received by said second resonance circuit by comparing a detection output of said second detecting circuit with a predetermined threshold level;

(iv) a data demodulating means for demodulating a transmission data signal represented by the first and second duty ratios of said transmission pulse signal on the basis of an output of the second comparator upon data reception from said first device;

(v) memory control means for writing/reading a transmission data signal in/out of a memory; and (vi) reverberation control means which has switching elements connected between said second resonance circuit and ground and which upon receiving transmission data read out of memory from said memory control means controls a reverberation caused in said second resonance circuit by turning on/off said switching elements in correspondence to transmission data at the timing of the cessation of the oscillation of said oscillator on the basis of transmission pulse signal derived from said second comparator upon data transmission to said first device.

5. An apparatus according to claim 1, wherein said oscillator of said first device comprises:

a parallel resonance circuit comprising resonance elements including a first type of resonance element and a pair of series connected second type of resonance elements;

an oscillation transistor whose first terminal is connected to one electrical end of said parallel resonance circuit, the other electrical end of which is connected to a first terminal of a voltage source, said transistor including a second terminal coupled to a mid-point of said series connected second type of resonance elements and to a second terminal of said voltage source and having a base coupled to a bias source; and a switching element arranged between said first type of resonance element and said series connected second type of resonance elements of said resonance circuit for opening and closing said resonance circuit, and wherein the oscillation of said oscillator is intermittently controlled by operation of said switching element.

6. An oscillator comprising: a parallel resonance circuit comprising resonance elements including a first type of resonance element and a pair of series connected second type of resonance elements;

a transistor whose first terminal is connected to one electrical end of said parallel resonance circuit, the other electrical end of which is connected to a first terminal of a voltage source, said transistor including a second terminal coupled to a mid-point of said series connected second type of resonance elements and to a second terminal of said voltage source and having a base coupled to a bias source, said oscillator being used in a data communicating apparatus to transmit a signal by intermittently executing an oscillation;

a switching element for opening or closing said resonance circuit provided between said first type of resonance element and said series connected second type of resonance elements of said resonance circuit;

and wherein the oscillation is intermittently controlled by operation of said switching element.

7. An apparatus according to claim 4, wherein said oscillator of said first device comprises:

a resonance circuit comprising resonance elements;

an oscillation device connected to said resonance circuit, such that said resonance circuit affects the oscillation frequency of said oscillation device;

a switching element arranged between at least two of said resonance elements to open or close a connection between said at least two resonance elements; wherein the oscillation of said oscillator is intermittently controlled by operation of said switching element.

8. An oscillator comprising:

a parallel resonance circuit comprising resonance elements;

an oscillation device connected to said resonance circuit such that said resonance circuit affects the oscillation frequency of said oscillation device, said oscillator being used in a data communicating apparatus to transmit a signal by intermittently executing an oscillation; and a switching element for opening or closing a connection path between at least two resonance elements wherein the oscillation of said oscillator is intermittently controlled by operation of said switching element.

9. A data communicating apparatus for performing a half-duplex transmission of serial data, which comprises a first device and a second device, wherein said first device comprises:

(a) an oscillator which has a first coil arranged on a surface which can face said second device;

(b) transmission pulse generating means for generating a transmission pulse signal of a predetermined period having a first or second duty ratio in correspondence to a transmission data signal upon data transmission and a predetermined third duty upon data reception, and for giving the transmission pulse signal of the predetermined period to said oscillator to cause said oscillator to intermittently oscillate n accordance with the duty ratio provided by said transmission pulse generating means;

(c) a resonance circuit which has a resonance frequency that is substantially equal to an oscillating frequency of said oscillator and which includes a second coil arranged on the surface that can face said second device;

(d) a timing control circuit for providing a signal which causes said transmission pulse generating means to provide said transmission pulse signals to said oscillator;

(e) reception gate signal generating means connected to said timing control circuit for receiving said timing control circuit signal and for generating a reception gate signal having a timing corresponding to when the oscillation of said oscillator is stopped;

(f) a detecting circuit switchingly connected to said resonance circuit for detecting an electromagnetic induction signal obtained in said resonance circuit for a time when said reception gate signal of said reception gate signal generating means switchingly connects said detecting circuit to said resonance circuit;

(g) a sample and hold circuit for sampling an output of said detecting circuit at a predetermined timing of the reception gate signal; and (h) a comparator for comparing a signal held by said sample and hold circuit with a predetermined level.

10. A data communicating apparatus for performing a half-duplex transmission of serial data which compromises a first device and a second device wherein said second device comprises:

(i) a resonance circuit which has a resonance frequency that is substantially equal to an oscillating frequency of said first device and which includes a coil arranged on a surface that can face said first device;

(ii) a detecting circuit for detecting a signal obtained in said resonance circuit;

(iii) a comparator for reproducing a transmission pulse signal received by said resonance circuit and transmitted by said first device by comparing a detection output of said detecting circuit with a predetermined threshold level;

(iv) a data demodulating means for demodulating a transmission data signal represented by the first and second duty ratios of said transmission pulse signal on the basis of an output of the comparator upon data reception from said first device;

(v) memory control means for writing/reading a transmission data signal in/out of a memory; and (vi) reverberation control means which has switching elements connected between said resonance circuit and ground and which upon receiving transmission data from said memory control means controls a reverberation that is caused in said resonance circuit by turning on/off said switching elements in correspondence to transmission data at the timing of the cessation of the oscillation of said oscillator on the basis of reception of a transmission pulse signal having a third duty ratio which is derived from said comparator upon data transmission to said first device.

11. A data communicating apparatus for performing a data transmission of serial data between a first device and a second device, wherein said first device comprises:

(a) an oscillator which has a first coil arranged on a surface that can face said second device;

(b) transmission pulse generating means for continuously generating a transmission pulse signal of a first or second duty ratio, for switching said first and second duty ratios in correspondence to a transmission data signal upon data transmission, for giving the transmission pulse signal to said oscillator, and thereby for intermittently causing oscillation of said oscillator in accordance with said first or second duty ratio;

(c) a resonance circuit which has a resonance frequency that is substantially equal to an oscillating frequency of said oscillator and includes a second coil arranged on the surface that can face said second device;

(d) a timing control circuit for providing a signal which causes said transmission pulse generating means to provide said transmission pulse signal to said oscillator;

(e) reception gate signal generating means connected to said timing control circuit for receiving said timing control signal and for generating a reception gate signal having a timing corresponding to the cessation of said oscillator;

(f) a detecting circuit connected to said resonance circuit through a switch controlled by said reception gate signal in order to enable said detecting circuit to detect an electromagnetic induction signal obtained in said resonance circuit for a time when said reception gate signal is given from said reception gate signal generating means;

(g) a sample and hold circuit for sampling an output of said detecting circuit at a predetermined timing of the reception gate signal; and (h) a comparator for comparing a signal held by said sample and hold circuit with a predetermined level.

12. A data communicating apparatus for performing a data transmission of serial data between a first device having an oscillator and a second device, wherein said second device comprises:

(i) a resonance circuit which has a resonance frequency that is substantially equal to an oscillating frequency of said oscillator of said first device and which includes a coil arranged on a surface that can face said first device;

(ii) a detecting circuit for detecting a signal obtained in said resonance circuit;

(iii) a comparator for reproducing a transmission pulse signal received by said resonance circuit and transmitted by said first device by comparing a detection output of said detecting circuit with a predetermined threshold level;

(iv) a data demodulating means for demodulating a transmission data signal represented by the first and second duty ratios of said transmission pulse signal on the basis of an output of the comparator upon data reception from said first device;

(v) memory control means for writing/reading a transmission data signal in/out of a memory; and (vi) reverberation control means which has switching elements connected between said resonance circuit and ground and which upon receiving transmission data read out of memory from said memory control means controls a reverberation caused in said resonance circuit by turning on/off said switching elements in correspondence to transmission data at the timing of cessation of the oscillation of said oscillator on the basis of the transmission pulse signal derived from said comparator upon data transmission to said first device.

* * * * *

UNITED STATES PATENT AND TRADEMARK OFFICE
CERTIFICATE OF CORRECTION

PATENT NO. : 5,313,198
DATED : May 17, 1994
INVENTOR(S) : Iichi Hirao, Et al.

It is certified that error appears in the above-identified patent and that said Letters Patent is hereby corrected as shown below:

On the title page: Item

--[30] Foreign Application Priority Data

Dec. 9, 1987 [JP] .................... 62-311290
    Dec. 9, 1987 [JP] .................... 62-322291
    Jul. 15, 1988 [JP] ................... 63-177585
    Dec. 9, 1987 [JP] .................... 62-187405
    Dec. 11, 1987 [JP] ................... 62-189066--

Signed and Sealed this

Twenty-seventh Day of September, 1994

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,313,198
DATED : May 17, 1994
INVENTOR(S) : Iichi Hirao, Et al.

It is certified that error appears in the above-identified patent and that said Letters Patent is hereby corrected as shown below:

ON THE TITLE PAGE

Please insert the following:

--[30] Foreign Application Priority Data

```
Dec.  9, 1987 [JP] .................. 62-311290
Dec.  9, 1987 [JP] .................. 62-311291
Jul. 15, 1988 [JP] .................. 63-177585
Dec.  9, 1987 [JP] .................. 62-187405
Dec. 11, 1987 [JP] .................. 62-189066--
```

This certificate supersedes Certificate of Correction issued September 27, 1994.

Signed and Sealed this

Sixth Day of December, 1994

Attest:

BRUCE LEHMAN

Attesting Officer    Commissioner of Patents and Trademarks